United States Patent

Khaytman

[11] Patent Number: 6,047,633
[45] Date of Patent: Apr. 11, 2000

[54] SHISH KEBAB ROTISSERIE

[76] Inventor: Yefim B. Khaytman, 1419 Pickett St. SE., Kentwood, Mich. 49508-4649

[21] Appl. No.: 09/338,388

[22] Filed: Jun. 22, 1999

Related U.S. Application Data

[60] Provisional application No. 60/090,604, Jun. 23, 1998.

[51] Int. Cl.[7] .............................. A47J 37/00; A47J 37/04
[52] U.S. Cl. ...................... 99/421 V; 99/419; 99/443 R; 99/446; 99/448
[58] Field of Search ............................. 99/330–334, 341, 99/340, 419–421 V, 443 R, 393, 444–450, 337, 339; 219/389, 392; 126/41 A, 41 R, 25 R; D7/331

[56] References Cited

U.S. PATENT DOCUMENTS

| | | | |
|---|---|---|---|
| D. 391,799 | 3/1998 | Haring et al. . | |
| 1,790,488 | 1/1931 | Saunders et al. | 99/341 X |
| 2,019,170 | 10/1935 | Barlow | 99/421 R |
| 2,049,481 | 8/1936 | Walterspiel | 99/341 X |
| 2,517,360 | 8/1950 | Singer | 99/443 R |
| 2,549,019 | 4/1951 | Saunders | 99/339 X |
| 2,622,506 | 12/1952 | Finizie | 99/421 V |
| 2,687,080 | 8/1954 | Dorin | 99/421 V |
| 2,810,598 | 10/1957 | Lief | 99/419 X |
| 3,009,410 | 11/1961 | Murphy | 99/421 V |
| 3,221,638 | 12/1965 | Wickenberg | 99/421 P |
| 3,331,310 | 7/1967 | White | 99/421 V |
| 3,604,341 | 9/1971 | Coroneos | 99/421 V |
| 3,744,403 | 7/1973 | Castronuovo | 99/421 V |
| 4,366,750 | 1/1983 | Brown et al. . | |
| 4,372,199 | 2/1983 | Brown et al. . | |
| 4,589,333 | 5/1986 | Murphy . | |
| 4,619,190 | 10/1986 | Smith . | |
| 4,829,158 | 5/1989 | Burnham . | |
| 4,887,523 | 12/1989 | Murphy et al. . | |
| 5,001,971 | 3/1991 | Beller . | |
| 5,030,809 | 7/1991 | Buday . | |

(List continued on next page.)

FOREIGN PATENT DOCUMENTS

| | | |
|---|---|---|
| 7-167633 | 7/1995 | Japan . |
| 8-166559 | 6/1996 | Japan . |
| 8-211332 | 8/1996 | Japan . |
| 8-234141 | 9/1996 | Japan . |
| 9-218376 | 8/1997 | Japan . |
| 10-48569 | 2/1998 | Japan . |

Primary Examiner—Timothy Simone
Attorney, Agent, or Firm—Waters & Morse, P.C.

[57] ABSTRACT

A shish kebab rotisserie includes a frame having a base and an opposing top; a support member connected between the base and the top to support the top relative to the base; a number of skewer rotors connected with the base, each skewer rotor having an axis and being rotatable about its axis; a drive operatively connected with the skewer rotors to rotate each skewer rotor about its axis; a heat source connected with the base and spaced a distance from the skewer rotors; and a skewer extending generally perpendicularly from the base to the top, the skewer being supported at the base by a skewer rotor and being supported by the top, the skewer being releasably coupled with the skewer rotor to rotate with the skewer rotor. The skewer may extend beyond the top to a handle portion of the skewer. A skewer shaft extends from the handle portion toward the skewer rotor. The shaft has a generally cylindrical portion adjacent the handle portion, and has a generally flat portion adjacent the cylindrical portion and opposite the handle portion. The skewer may further include a clamp adjacent the flat portion and opposite the cylindrical portion, so that portion of the skewer shaft from the clamp to the skewer rotor may be a skewer stick that is clamped in the clamp. The top has a perimeter edge with a slot extending inward from the perimeter edge and at least one skewer support hole along the slot. Thus, the skewer shaft flat portion slides through the slot and the skewer shaft cylindrical portion rotatably seats in the hole. An adjustment mechanism may be connected between the heat source and the skewer rotors to adjust the distance between the heat source and the skewer rotors. The base may include a drive housing and a shell housing, wherein the drive housing and the shell housing are rotatably connected.

22 Claims, 21 Drawing Sheets

U.S. PATENT DOCUMENTS

| | | |
|---|---|---|
| 5,176,067 | 1/1993 | Higgins . |
| 5,515,774 | 5/1996 | Swisher et al. . |
| 5,533,440 | 7/1996 | Sher . |
| 5,575,196 | 11/1996 | Masel et al. . |
| 5,586,490 | 12/1996 | Saman . |
| 5,639,497 | 6/1997 | Bedford et al. . |
| 5,649,475 | 7/1997 | Murphy et al. . |
| 5,665,258 | 9/1997 | Hsu . |
| 5,726,704 | 3/1998 | Uomori ................ 348/47 |
| 5,737,012 | 4/1998 | Tabata et al. ........ 348/53 |
| 5,801,760 | 9/1998 | Uomori ................ 348/47 |
| 5,845,563 | 12/1998 | Haring et al. . |
| 5,866,876 | 2/1999 | Su . |

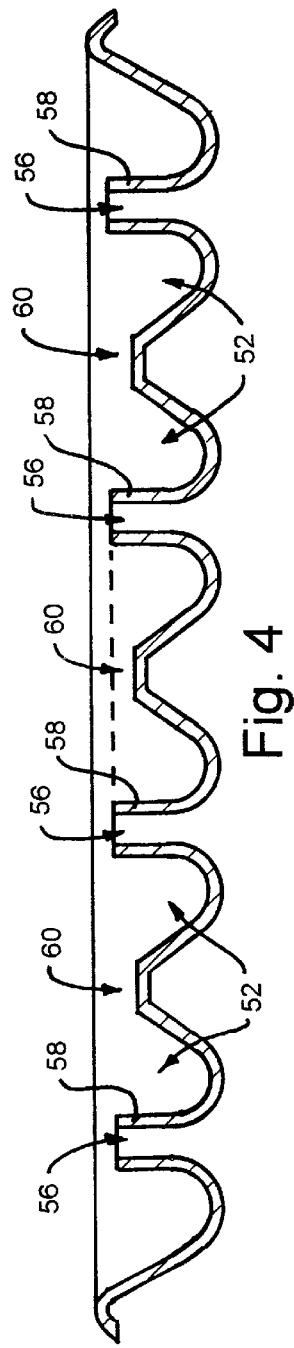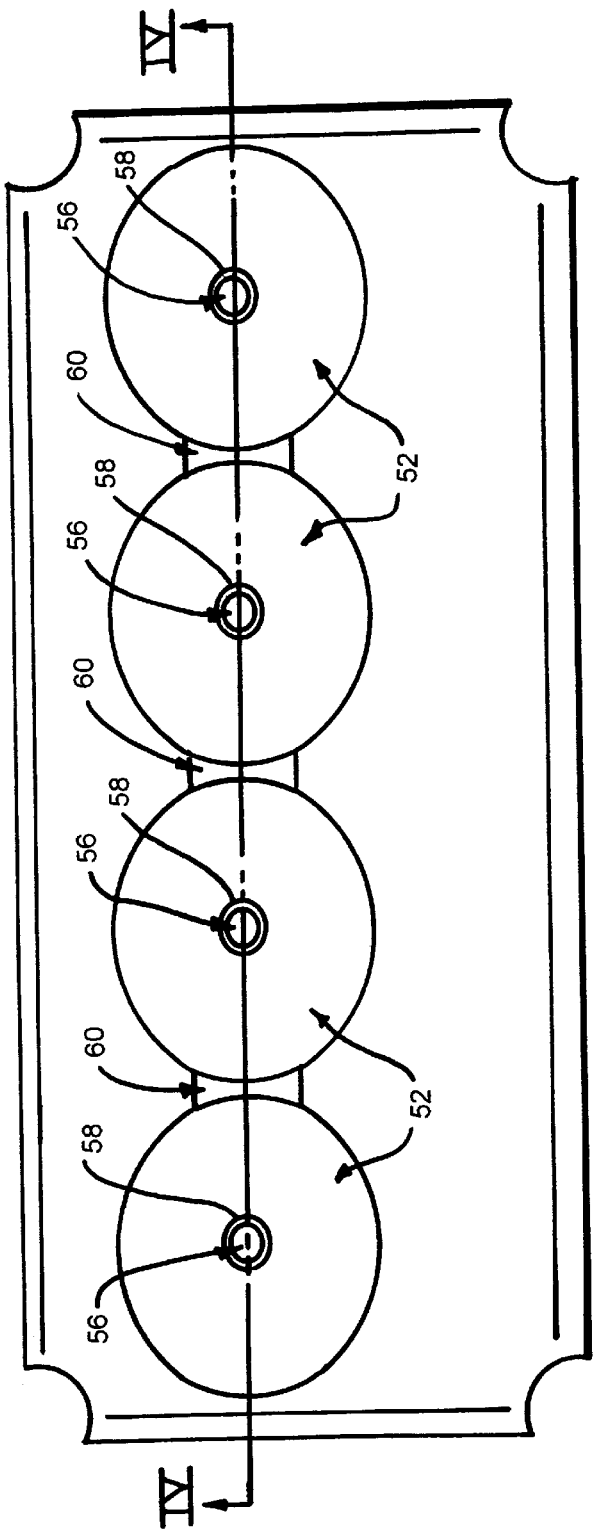
Fig. 4
Fig. 3

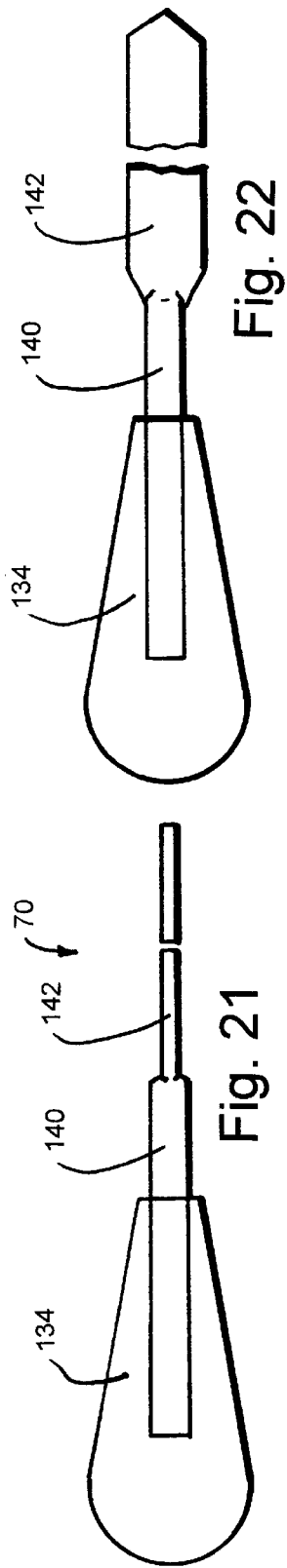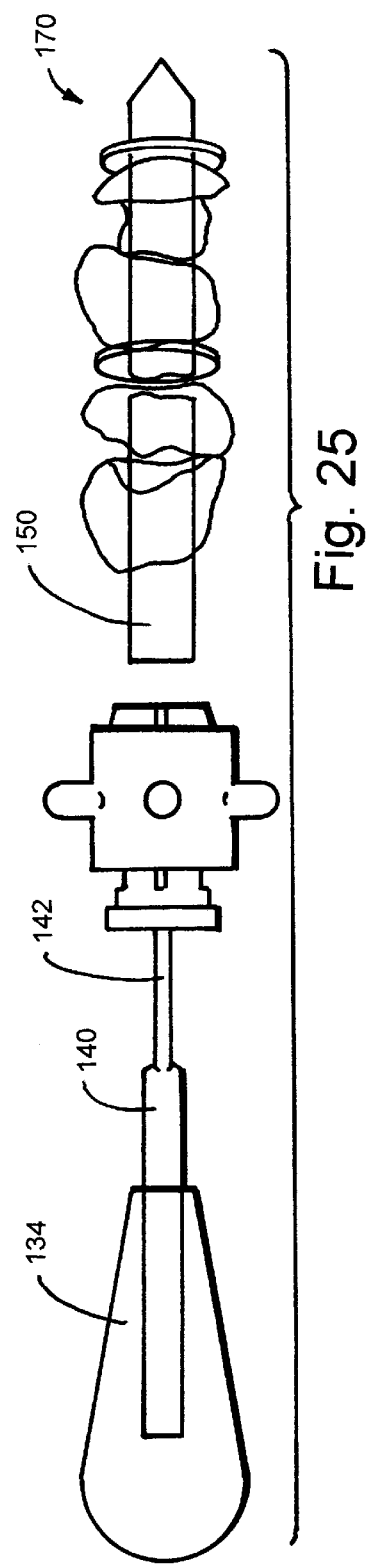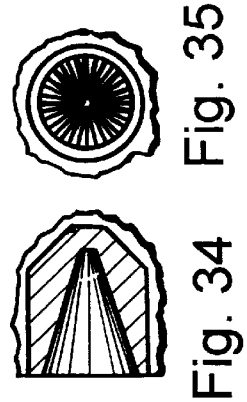

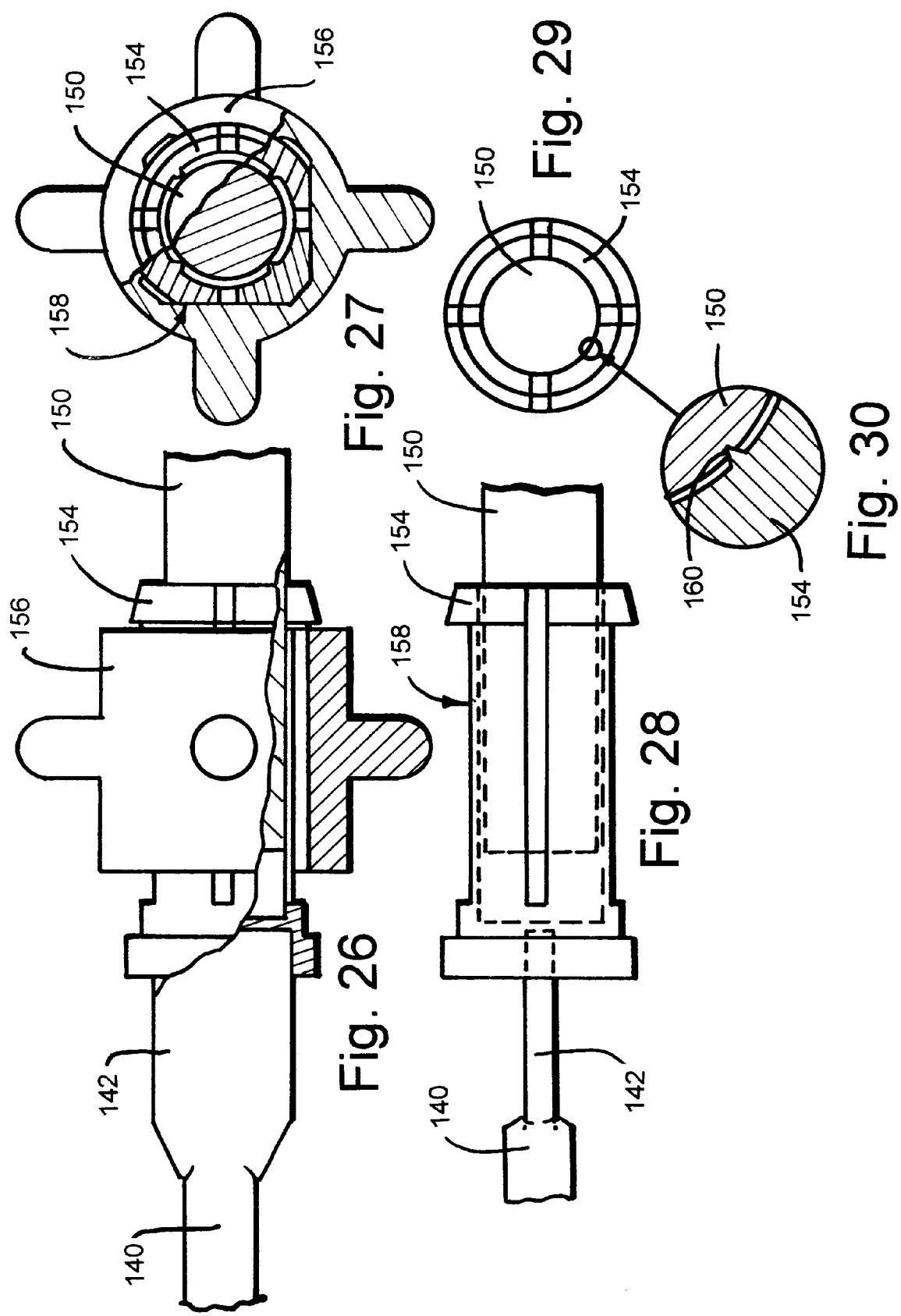

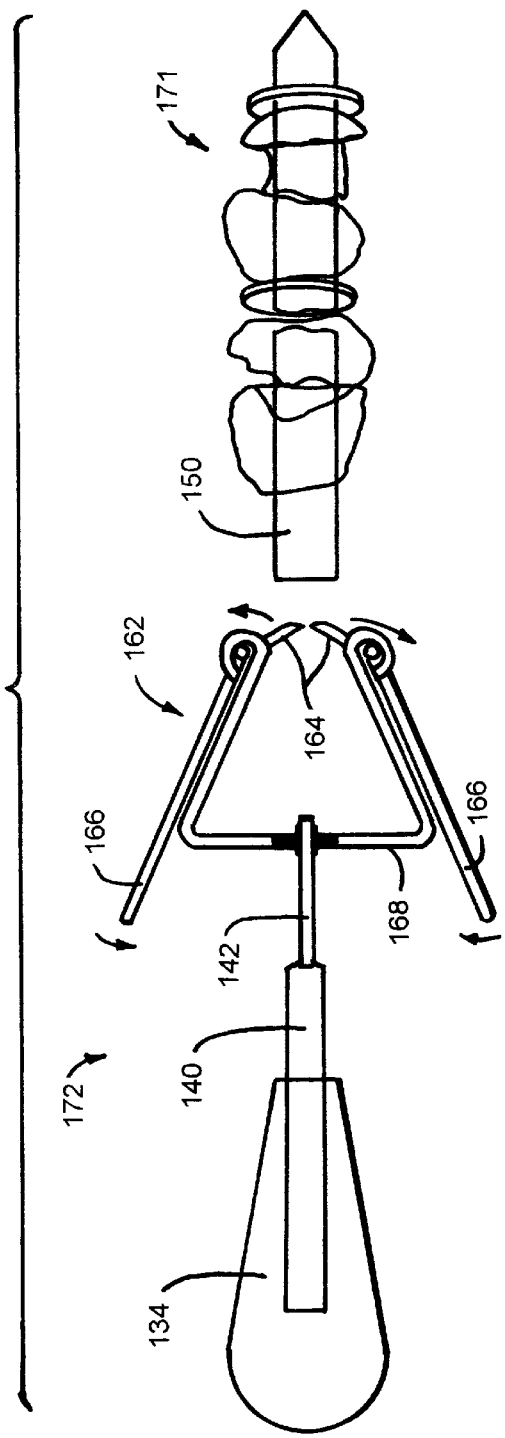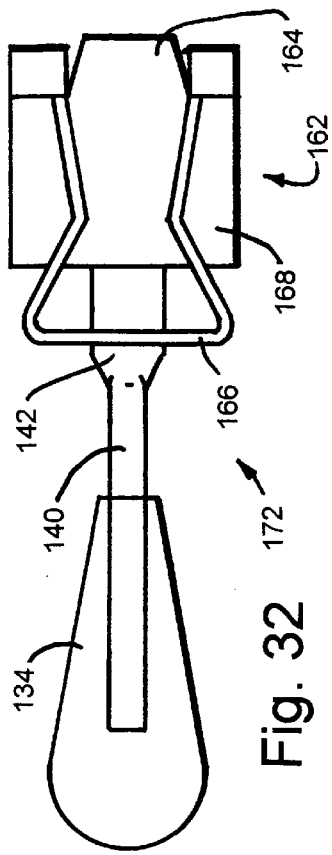
Fig. 31
Fig. 32

SHISH KEBAB ROTISSERIE

CROSS-REFERENCES TO RELATED APPLICATIONS

This application claims the benefit of U.S. Provisional Application No. 60/090,604, filed Jun. 23, 1998.

STATEMENT REGARDING FEDERALLY SPONSORED RESEARCH OR DEVELOPMENT

Not Applicable.

BACKGROUND OF THE INVENTION

The invention relates to shish kebab rotisseries, and more specifically to a self contained shish kebab rotisserie unit. As is self evident, the food market place is driven to provide quick meals. Unfortunately, this all too often means compromising dietary quality for expediency at a so called fast food restaurant. Thus, various alternatives to the traditional fast food restaurant are evolving.

One such alternative is shish kebab, which is both a healthy and convenient main course for a meal. One may prepare kebob and arrange a skewer of shish kebab, although pre-prepared shish kebab is common at store meat counters. A convenient and effective shish kebab rotisserie is not, however, available for home or commercial use. Rather, one typically finds shish kebab prepared on a grill or the like. The available shish kebab rotisserie appliances compromise cooking quality with inadequate temperature control or uneven cooking or the like. Thus, the desirability for a shish kebab rotisserie that provides quality, consistent cooking is readily seen.

BRIEF SUMMARY OF THE INVENTION

Accordingly, a shish kebab rotisserie of the invention includes a frame having a base and an opposing top. A support member is connected between the base and the top to support the top relative to the base. A number of skewer rotors are mounted in the base, each skewer rotor having an axis and being rotatable about its axis. A drive is operatively connected with the skewer rotors to rotate each skewer rotor about its axis. A heat source is connected with the base and spaced a distance from the skewer rotors. A skewer extends generally perpendicularly from the base to the top. The skewer is supported at the base by a skewer rotor and is also supported by the top. The skewer is releasably coupled with the skewer rotor to rotate with the skewer rotor.

In one aspect of the invention, the skewer may extend beyond the top to a handle portion of the skewer. A skewer shaft extends from the handle portion toward the skewer rotor. The shaft has a generally cylindrical portion adjacent the handle portion, and has a generally flat portion adjacent the cylindrical portion and opposite the handle portion. The skewer may further include a clamp adjacent the flat portion and opposite the cylindrical portion, so that portion of the skewer shaft from the clamp to the skewer rotor may be a skewer stick that is clamped in the clamp. Further, top may have a perimeter edge with a slot extending inward from the perimeter edge and at least one skewer support hole along the slot. Thus, the skewer shaft flat portion slides through the slot and the skewer shaft cylindrical portion rotatably seats in the hole.

An adjustment mechanism may be connected between the heat source and the skewer rotors to adjust the distance between the heat source and the skewer rotors. A location of the heat source may be fixed relative to the base and manipulation of the adjustment mechanism may move the skewer rotors toward and away from the heat source. Conversely, the skewer rotors may be fixed relative to the base and manipulation of the adjustment mechanism may move the heat source toward and away from the skewer rotors.

The base may also include a drive housing and a shell housing, wherein the drive housing and the shell housing are rotatably connected.

These and other features, objects, and benefits of the invention will be recognized by one having ordinary skill in the art and by those who practice the invention, from the specification, the claims, and the drawing figures.

BRIEF DESCRIPTION OF THE SEVERAL VIEWS OF THE DRAWING

FIG. 3 is a top plan view of a drip pan thereof;

FIG. 4 is a cross-sectional view along section line IV—IV of FIG. 3;

FIG. 21 is a side elevational view of a skewer for the shish kebab rotisserie, showing an edge of the blade with a portion of the blade cut away;

FIG. 22 is another side elevational view thereof, showing a flat of the blade;

FIG. 25 is a side elevational view of a first alternative embodiment of a skewer handle assembly;

FIG. 26 is an enlarged detail of the clamp thereof in partial section;

FIG. 27 is an end elevational view thereof in partial section;

FIG. 28 is the view of FIG. 26 with the cam ring removed;

FIG. 29 is an end elevational view thereof;

FIG. 30 is an enlarged detail thereof, showing a jaw barb;

FIG. 31 is a side elevational view of a second alternative embodiment of a skewer handle assembly;

FIG. 32 is another side elevational view thereof;

FIG. 34 is an enlarged fragmentary detail from FIG. 5, showing an alternative recess for receiving a skewer end;

FIG. 35 is a fragmentary end view thereof;

DETAILED DESCRIPTION OF THE INVENTION

Figure 1:
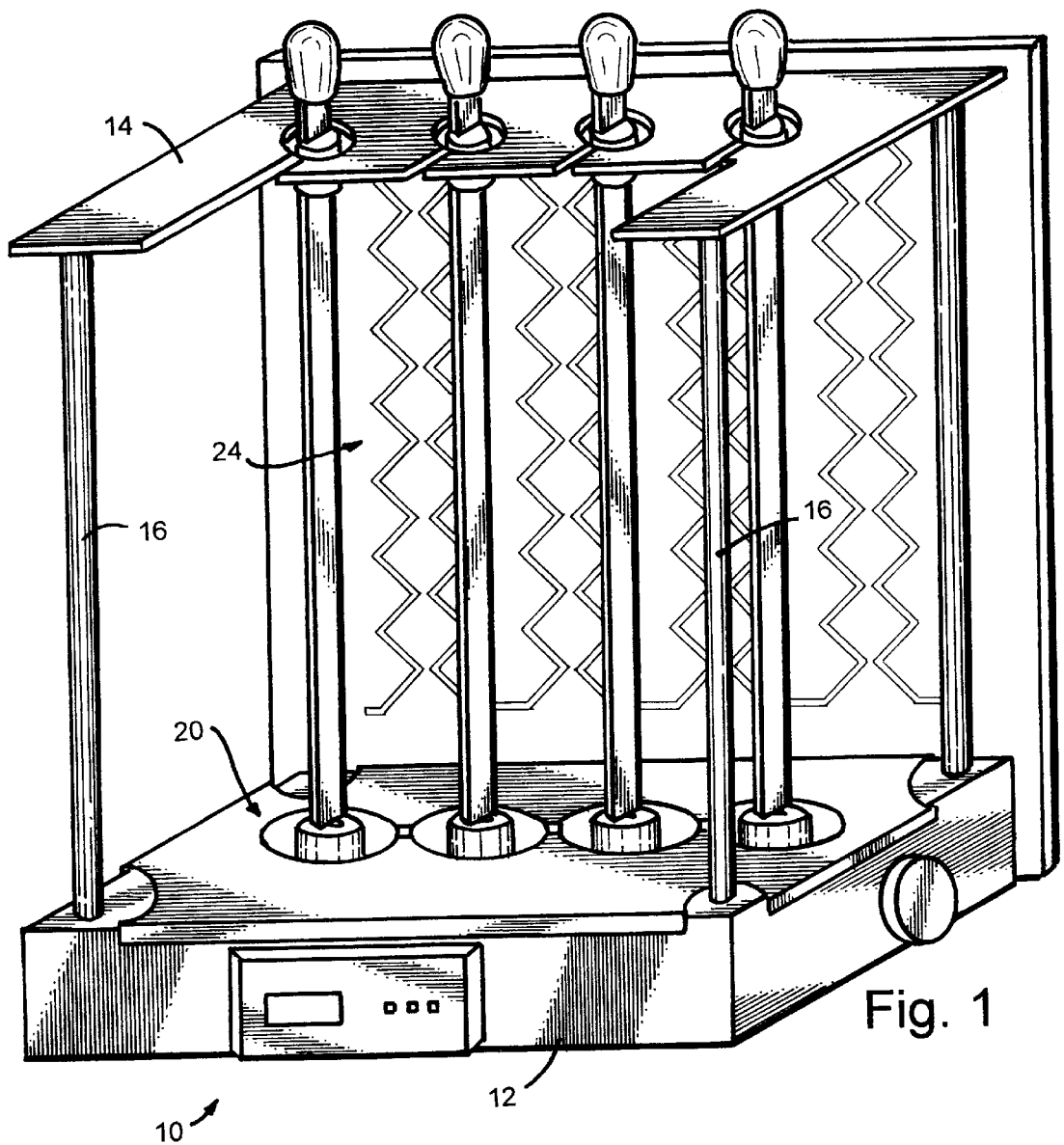
FIG. 1 is a front perspective view of a first embodiment of a shish kebab rotisserie according to the invention, with a splatter cover removed.

Addressing the drawing figures more specifically, FIG. 1 shows a first embodiment 10 of a shish kebab rotisserie according to the invention. The rotisserie unit 10 has a frame with a base 12 and an opposing top 14. A support member 16 may extend between the base 12 and the top 14 to support the top. A number of skewer rotors 20 are located at the base 12 and a drive 22, which is contained within the base, is operatively connected to rotate the skewer rotors. A heat source 24 is spaced a distance from the skewer rotors 20 and connected with the base 12 by an adjustment mechanism 26 that allows adjustment of a distance between the heat source and the skewer rotors.

Figure 2:
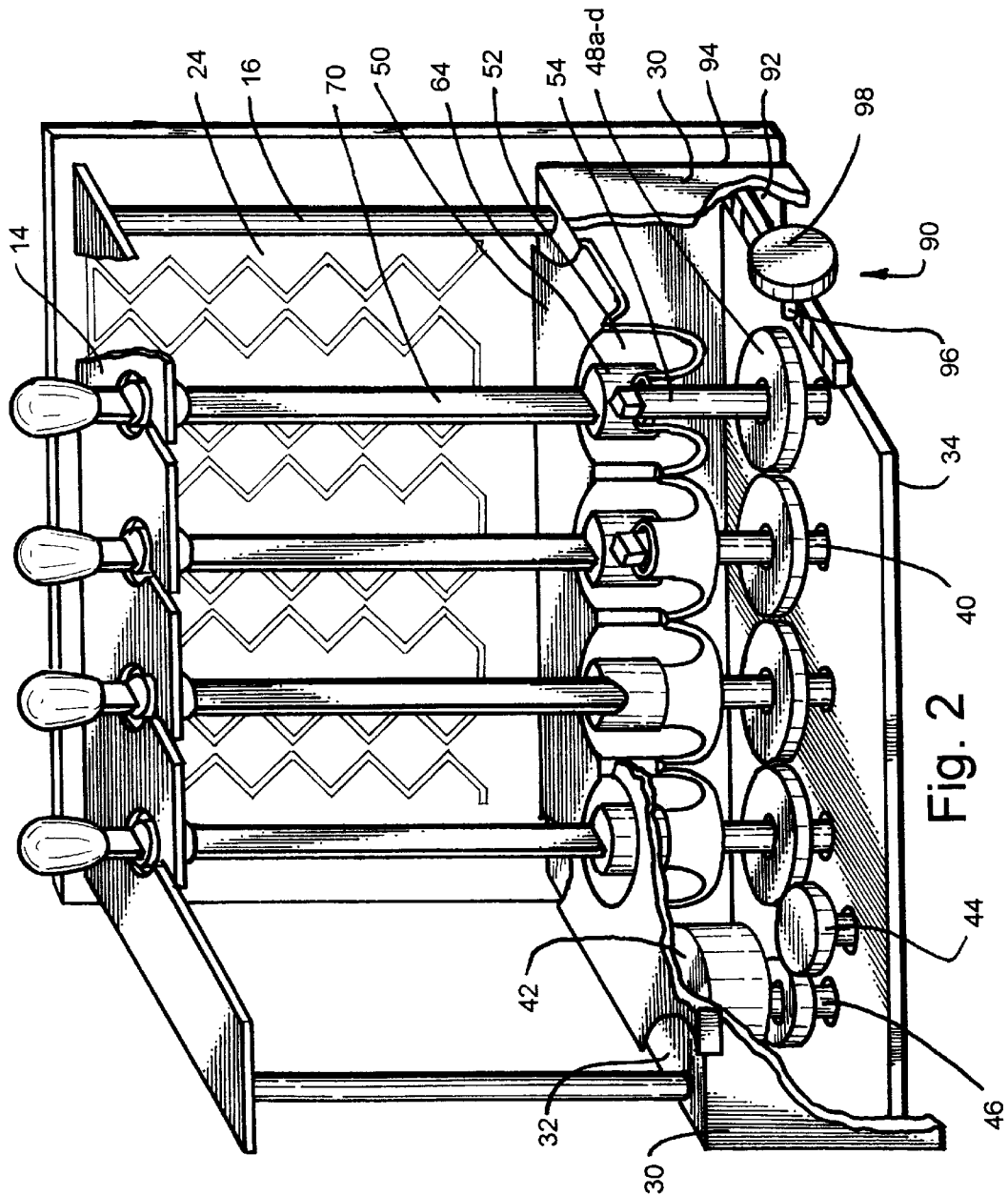
FIG. 2 is the view of FIG. 1, partially broken away to show the rotisserie drive and the adjustment mechanism.
Figure 6:
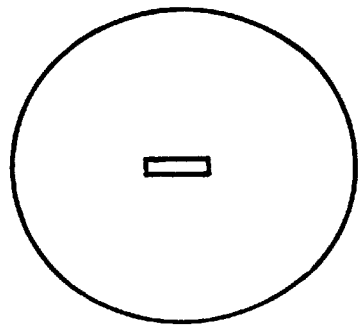
FIG. 6 is a top plan view thereof.
Figure 5:
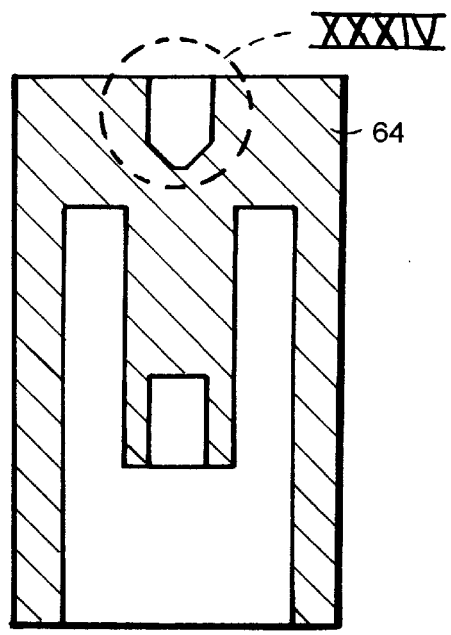
FIG. 5 is a centerline cross-sectional view through a skewer adapter.
Figure 7:
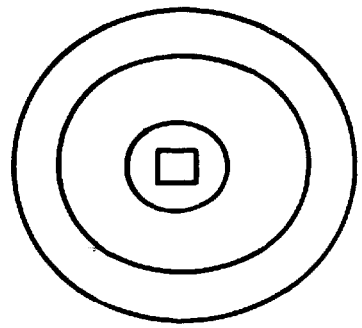
FIG. 7 is a bottom plan view thereof.

The base 12 has a box configuration with four side walls 30, a top panel 32, and preferably a bottom panel 34 (FIG. 2). The base 12 may be constructed of any suitable material by any method appropriate to the material selected. Most commonly, construction of the base may include a stainless steel stamping or welding, or an injection molded plastic construction, for example, as will be understood by one having ordinary skill in the art. The base 12 may be made with various configurations or modifications without departing from the spirit and scope of the invention.

A number of pivot studs 40 are disposed to extend generally perpendicularly upward from the bottom panel 34. The studs 40 define pivot locations for each of the skewer rotors 20. An additional stud may be provided for each of a drive motor 42 and an idler gear 44. A drive pinion 46 on the drive motor 42 engages the idler gear 44, which in turn engages a drive gear 48a of the first skewer rotor. A drive gear 48b of the second skewer rotor engages the drive gear 48a of the first skewer rotor, while a drive gear 48c of the third skewer rotor engages the drive gear 48b of the second skewer rotor, and a drive gear 48d of the fourth skewer rotor engages the drive gear 48c of the third skewer rotor. One having ordinary skill in the art will readily understand the implementation of the gear drive-train and that the drive may be used with any desired number of skewer rotors with appropriate design specification. Further, various arrangements of or modifications to the drive-train may be made without departing from the spirit and scope of the invention.

A cooperating drip pan 50 seats upon the base top panel 32 and has a number of collection wells 52 that extend downward, into the base, through cooperating apertures in the base top panel, so each well is aligned with a drive gear 48. Again, various suitable materials and methods may be used to construct the grease drip pan 50. A tin stamping may be found to be desirable for production and durable for satisfactory use, for example.

Figure 8:
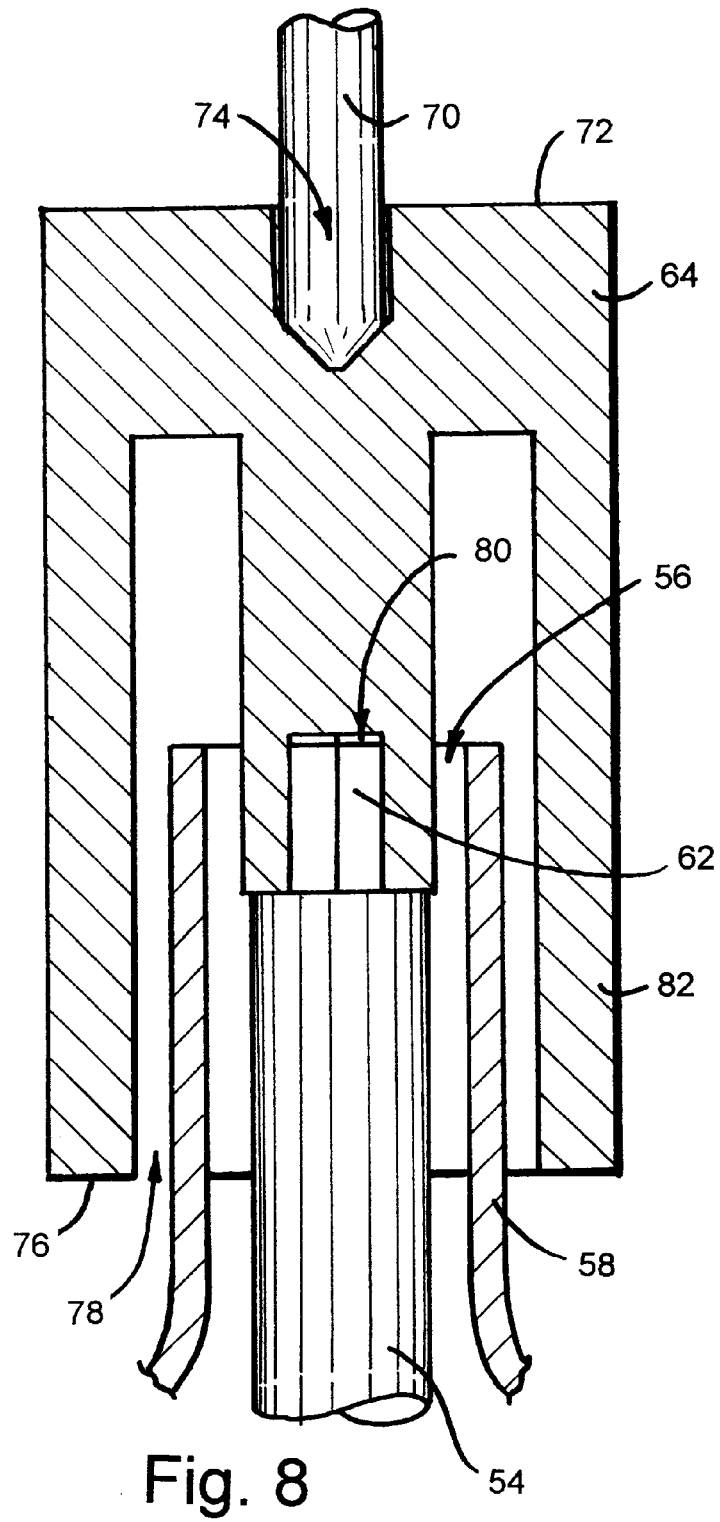
FIG. 8 is a fragmentary cross-sectional view similar to the view of FIG. 5, showing the skewer adapter installed on the skewer drive, over the drip pan.
Figure 8A:
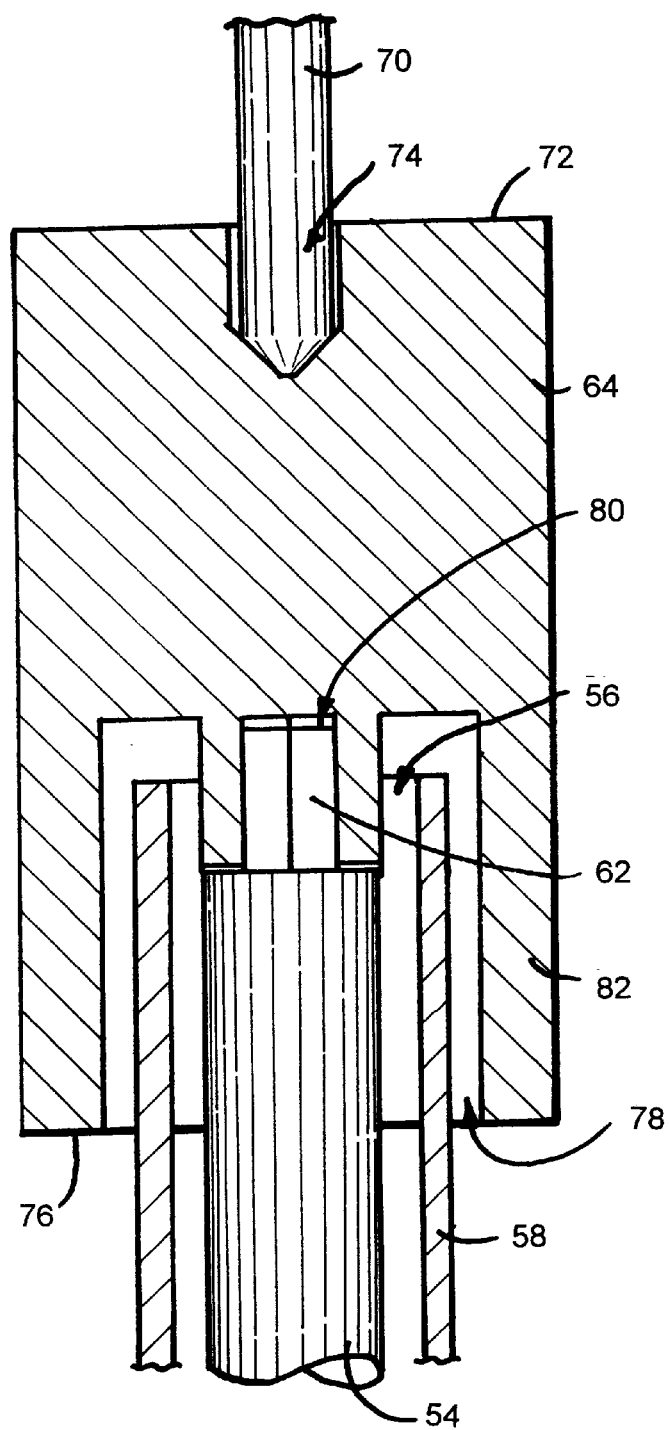
FIG. 8a is the view of FIG. 8, showing a first alternative skewer adapter configuration, installed on the skewer drive, over the drip pan.
Figure 8B:
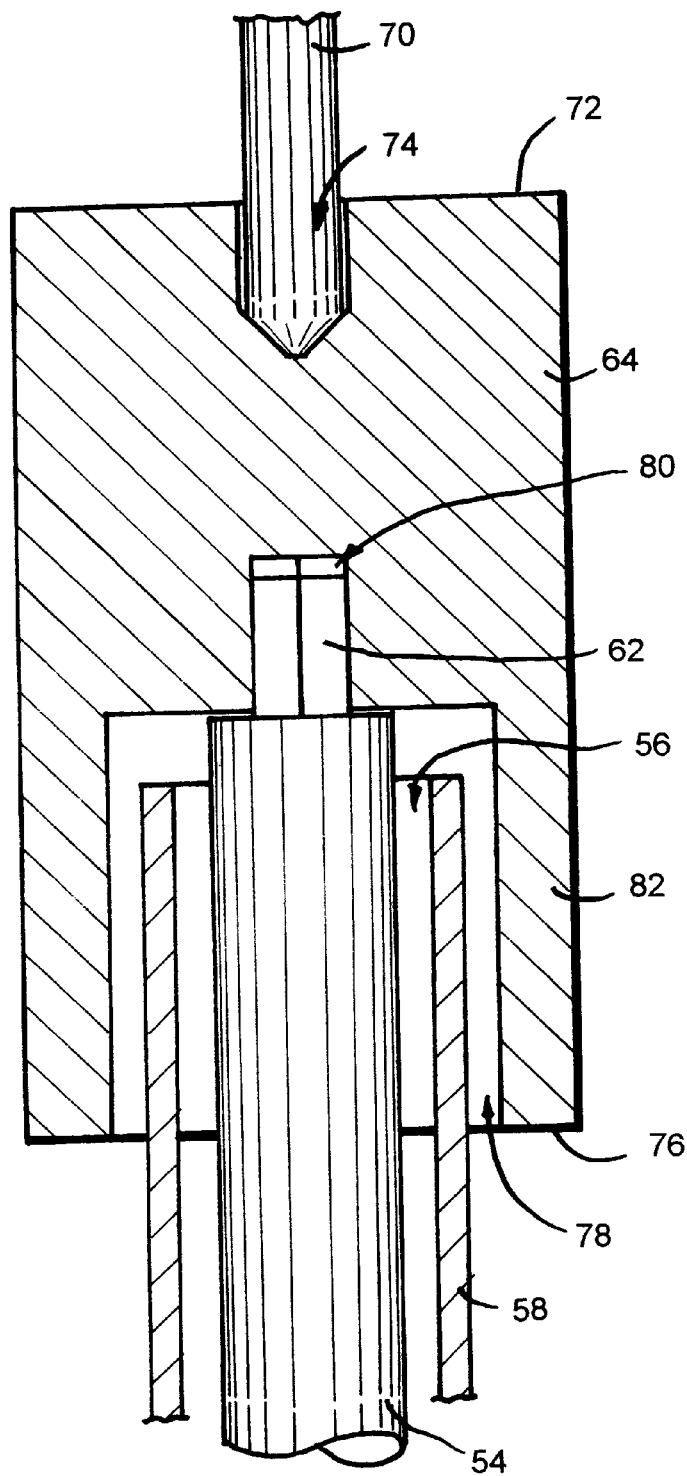
FIG. 8b is the view of FIG. 8, showing a second alternative skewer adapter configuration, installed on the skewer drive, over the drip pan.

Each collection well 52 has a generally centered aperture 56 (FIGS. 3, 4, and 8) that is aligned with a corresponding pivot pin 40 and a drive spindle 54 (discussed further below). To keep grease and the like from spilling through the aperture 56, into the base 12, each well 52 defines a generally open-sided annular ring or moat around an upstanding tubular wall 58 that defines the aperture 56.

Adjacent collection wells 52 are connected with a bridge 60 (FIG. 4), so grease may flow from a full well to an adjoining empty well, or a well that is not full. The connections or bridges 60 between adjacent wells 52 is lower than the upstanding tubular walls 58 that define the aperture 56 through the wells (as shown by the dotted line in FIG. 4), so grease will flow between the wells before flowing through the aperture 56.

A skewer drive shaft or spindle 54 extends generally upward from each skewer drive gear 48, and extends at least partially into, if not through, an aperture 56 of a collection well 52. Each drive shaft 54 extends upward to a terminal end 52 that is keyed to couple with a cooperating adapter 64 (FIGS. 2 and 6–8). The terminal end 62 of the spindle 54 may be squared, slotted, or provided with any desired keying shape, as will be understood by one having ordinary skill in the art. The adapter 64 provides a cap over the tubular wall 58 of the aperture 56, so grease may flow down the adapter and into the well 52, outside the aperture. The adapter 64 also couples the drive spindle 54 with a shish kebab skewer 70.

The adapter is preferably a right circular cylinder with two opposing, generally parallel ends. A top or first end 72 is provided with a recess 74 that is adapted to removably receive an end of a shish kebab skewer 70, so the skewer rotates with the adapter. The recess 74 may be provided with substantially any configuration, it is important that the recess provide a coupling with the skewer 70 for rotation of the skewer with the adapter. Bamboo sticks are commonly known to be used as shish kebab skewers, for example, for commonly available pre-prepared shish kebab. Thus, the recess 74 may be adapted for press-fit or gripping engagement with a stick-like skewer (FIGS. 34–35). Further, the top 72 of the adapter 64 may be defined as a flat surface or, more preferably, as a convex or conic surface, for example, to encourage hot grease to run off from the top of the adapter.

The opposing second, or bottom end 76 of the adapter 64 may have a generally cylindrical recess 78. The key features of the bottom recess 78 include a cooperating coupling 80 that is generally centered in the bottom end 76. The coupling 80 corresponds to the terminal end 62 of the drive spindle 54, and is adapted for releasable keyed coupling with the terminal end 62, so the adapter 64 will couple and rotate with the drive spindle. The coupling 80 is preferably recessed within the cylindrical bottom recess 78, so the outer, annular walls 82 of the adapter 64 define a skirt that overlaps the tubular wall 58 of a drip well 52. Thus, dripping grease is directed away from the aperture 56, flows over the adapter 64, is carried past the top of the tubular wall 58, and flows into the drip well 52.

The heat source 24 may be any suitable cooking heater, including resistance heating elements and quartz heating elements, for example, as are known by one having ordinary skill in the art. The inventor has found that a heat source that provides a temperature of about 350–400 degrees Fahrenheit at the surface of the shish kebab performs satisfactorily. The heater 24 is connected with the base 12 by an adjustment mechanism 90 that may be manipulated to adjust a distance between the heat source 24 and the skewer rotors 20 or skewers 70. One having ordinary skill in the art will appreciate that adjusting the distance between the heat 24 and the skewer 70 is desirable because the size of meat or other food pieces that are placed on a skewer for rotisserie cooking is not always the same and that the distance between the shish kebab on the skewer and the heat source affects the effective cooking temperature and the resulting cooking of the food, including the potential for burning. Thus, the heat source 24 may be moved closer to or farther from the skewer rotors 20, or skewers 70, to vary the effective cooking temperature at the shish kebab skewer 70.

In one embodiment, as shown in drawing FIG. 2, the adjustment mechanism 90 includes a rack member 92 that is connected with the heat source 24 at one end 94 and extends into the base 12. A pinion member 96 is located in the base 12 and engages the rack member 92 to extend or retract the rack member, as will be understood by one having ordinary skill in the art. The pinion member 96 may be coupled with a hand knob 98, so a user may turn the pinion member. Thus, a user may manipulate the hand knob 98 to rotate the pinion member 96 and either draw the rack 92 into or push the rack out of the base 12. As the rack member 92 is extended out of or retracted into the base 12, the heat source 24 is moved away from or closer to the skewer rotors 20 and skewers 70, respectively. A smaller distance between the heat source 24 and the skewers 70 will result in a relatively higher effective cooking temperature, while a greater distance between the skewers and the heat source will result in a relatively cooler effective cooking temperature.

To simplify the view of drawing FIG. 2, the adjustment mechanism 90 is shown on only one side of the shish kebab rotisserie unit 10. While this may provide a functional rotisserie unit with adjustment mechanism, it may be preferred that a second pinion member 96, engaging a second rack member 92, be provided on the opposite side of the base 12 and that the two pinion members be coupled together for synchronized operation. As will be understood by one having ordinary skill in the art, providing two rack members and two coupled or synchronized pinion members will minimize any tendency for racking and jamming of the adjustment device during manipulation to move the heat source. Alternatively, one may find that a single rack member that is centered relative to the shish kebab rotisserie unit 10 will provide satisfactory operation.

In use, one may prepare shish kebab with pieces of meat, onion, tomato, and pineapple, for example, placed on a shish kebab skewer. A tip or terminal end of the shish kebab skewer is placed into the recess 74 in the top 72 of an adapter 64 that is positioned in a drip well 52 to couple with a drive spindle 54. The skewer 70 is positioned generally upright from the adapter 64 and a handle end of the skewer is positioned in a cooperating holder that is defined in the top 14. With the desired number of skewers so prepared and positioned, the motor 42 may be started to engage the gear drive train and rotate the skewers, while the heat source is energized and adjusted with the adjustment mechanism to provide a desired cooking temperature.

In an alternative embodiment 110 of a shish kebab rotisserie with adjustable distance between a heat source and the shish kebab skewers is generally shown in the drawings FIGS. 10–14. While the skewers of the rotisserie unit 10 may be described as arranged in a linear pattern, the skewers of the rotisserie unit 110 may, in contrast, be said to be arranged in a circular pattern. Thus, one will appreciate that various modifications may be made regarding the invention without departing from the inventive concept. Many of the components of the rotisserie unit 110 are similar to the components of the rotisserie unit 10. Thus, the following description will focus on the changes in the adjustment mechanism that result from the circular pattern of the skewer arrangement.

Rotisserie 110 has a frame with a base 112 and an opposing top 114. Support members 116 extend between the base 112 and the top 114 to support the top. A heating unit 124 is generally centered in the rotisserie unit 110, and also extends between the base 112 and the top 114. A number of skewer rotors 120 are located at the base 112, and a drive, which is contained within the base, is operatively connected to rotate the skewer rotors. A distinction between the rotisserie unit 10 and the rotisserie 110 is that the heat source 24 is moved relative to the base 12 in the unit 10, while the skewer rotors 120 are moved relative to the base 112 in the unit 110.

Figure 11:
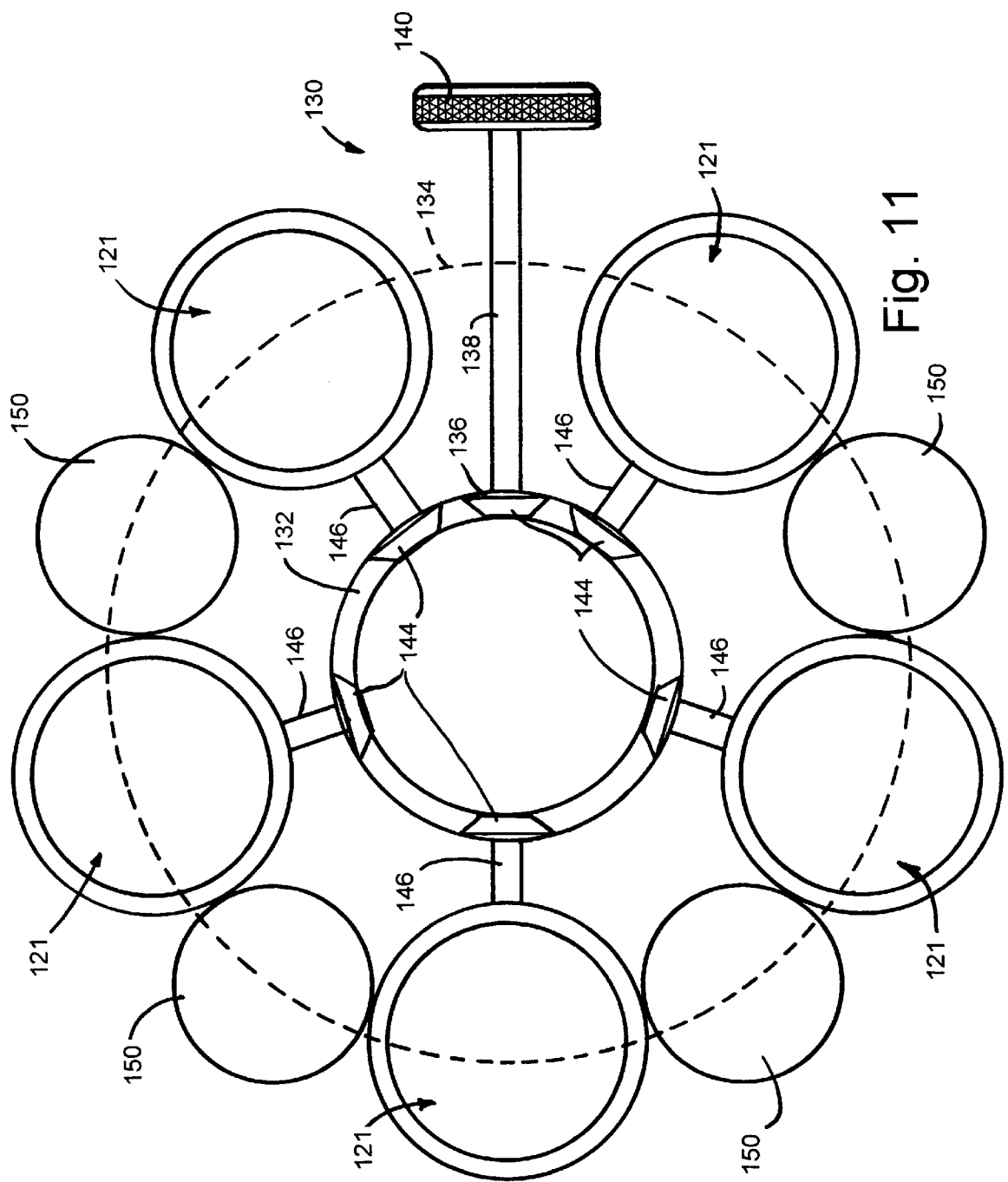
FIG. 11 is a top plan schematic view of an adjustment mechanism thereof.

An adjustment mechanism 130 is generally shown in schematic view in drawing FIG. 11. The adjustment mechanism 130 includes a crown gear 132 that is generally centered on a bottom panel 134 of the base 112, in rotating connection with the bottom panel. A drive pinion 136 is connected by a shaft 138 to a hand knob 140 for manipulation by a user, to rotate the crown gear 132. As shown, each of the crown gear 132 and the drive pinion 136 are preferably bevel gear members. Other rotational connection devices may be satisfactorily utilized, however, as will be understood by one having ordinary skill in the art.

The skewer rotors 120 are equally spaced in a circular pattern and connected with the base 112 to slide in a radial direction toward and away from the heating unit 124, which is generally centered in the rotisserie unit 110. Each of the skewer rotors 120 is connected with the crown gear 132 by a pinion gear 144, a screw threaded shaft 146, and a cooperating bracket (not shown) that couples with the shaft 146 in screw threaded engagement. Thus, when a user rotates the hand knob 140, shaft 138 is rotated to turn drive pinion 136. The drive pinion 136 in turn rotates the crown gear 132, which in turn rotates each of the pinion gears 144. The threaded shafts 146 turn with the pinion gears 144 to draw in or move out each of the skewer rotors 120 in threaded engagement.

Figure 12:
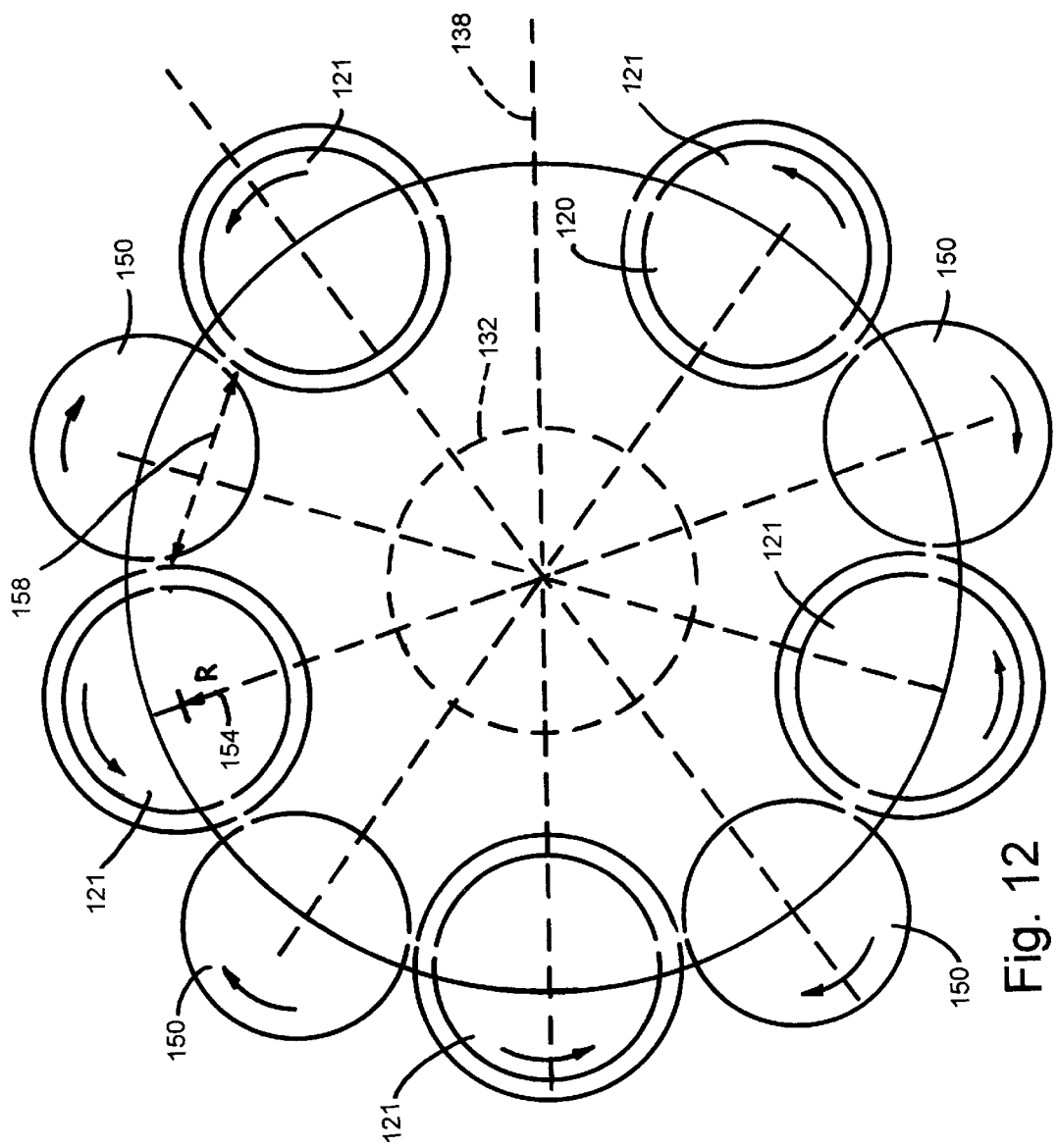
FIG. 12 is similar to the view of FIG. 11, showing the skewer rotors at a maximum distance.
Figure 13:
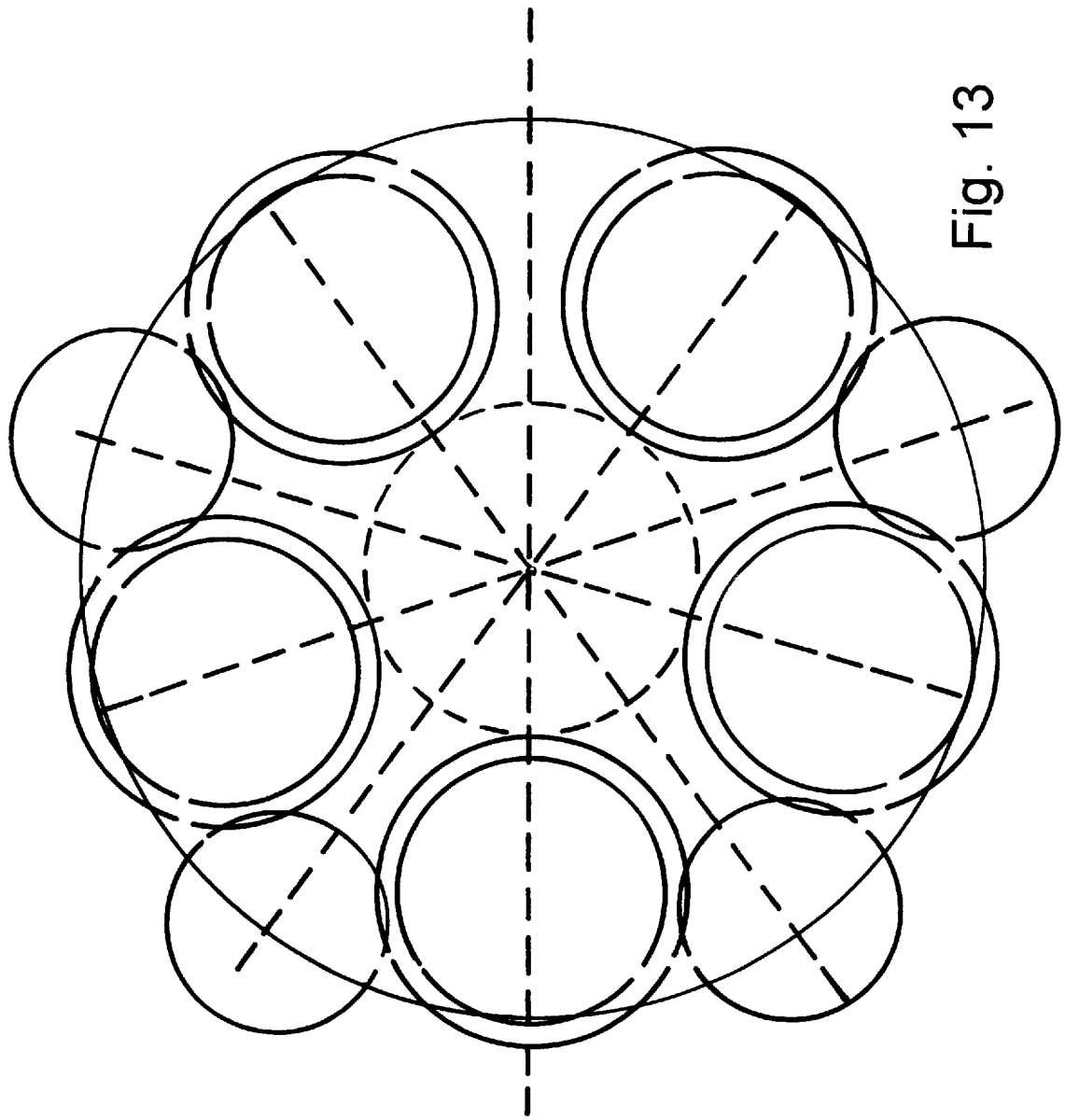
FIG. 13 is similar to the view of FIG. 11, showing the skewer rotors at an intermediate position.
Figure 14:
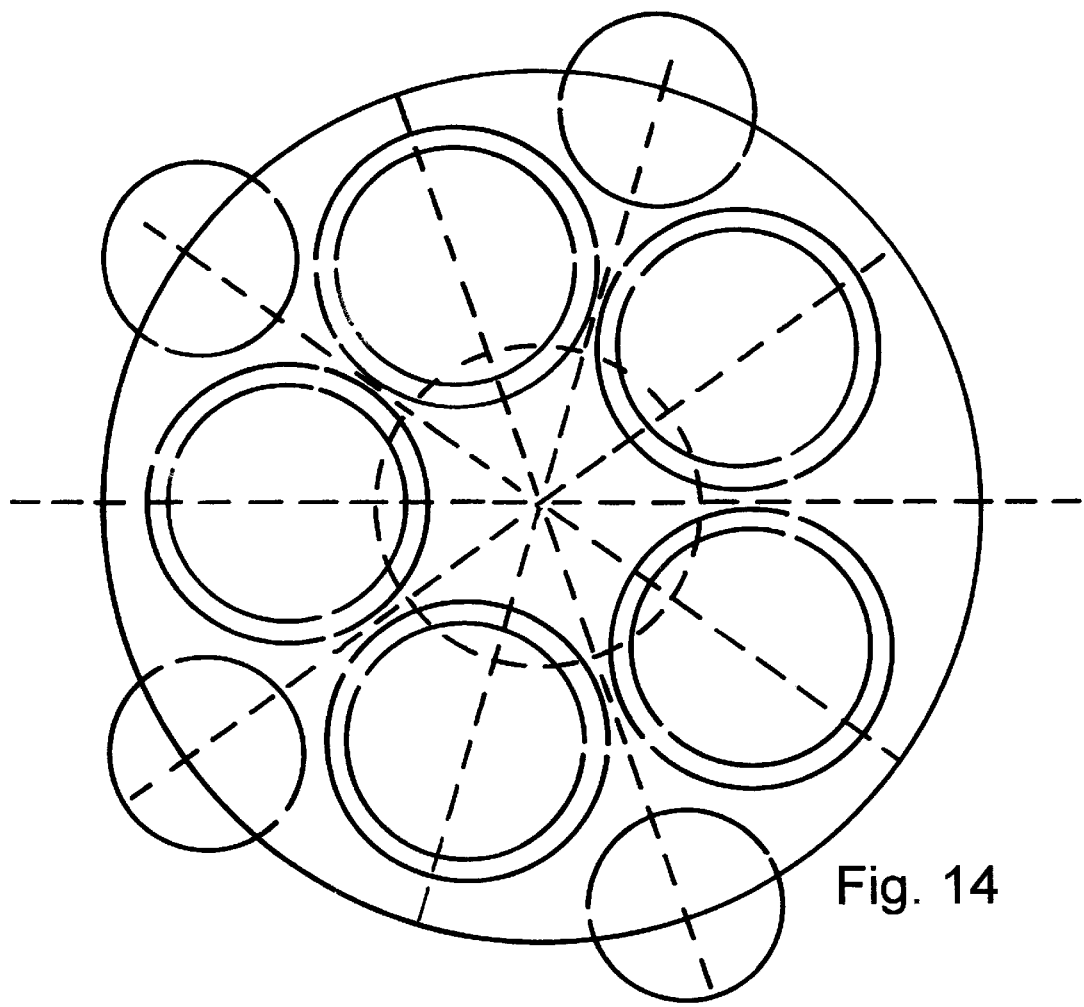
FIG. 14 is similar to the view of FIG. 11, showing the skewer rotors at a minimum position.

A rotisserie drive mechanism is generally shown in schematic view in drawing FIGS. 12–14. Adjacent skewer rotors 120 are interconnected by skewer rotor gears 121 and idler wheels or gears 150. An idler gear 150 is not, however, located at the position of the hand knob 140 and shaft 138.

The idler gears 150 provide power transmission between and among the skewer rotors 120. By connecting any one of the skewer rotor gears 121 or the idler gears 150 with a drive motor, all of the remaining idler gears 150, skewer rotor gears 121, and skewer rotors 120 will be rotatably driven, as will be understood by one having ordinary skill in the art. Like the skewer rotors 120, each of the skewer rotor gears 121 and idler gears 150 is connected with the base 112 to slide in a radial direction in toward, and out away from the generally centered heating unit 124. To keep the idler gears 150 and the skewer rotor gears 121 engaged with one another, each idler gear 150 is biased toward the center of the rotisserie unit 110. Because each idler gear 150 is biased toward the center of the rotisserie unit 110, the idler gears will press against and engage the two adjacent skewer rotor gears 121.

With the skewer rotor 120 and drive-train arrangement just described, rotation of each of the skewer rotors is obtained by driving only one of the skewer rotor gears 121 or idler wheels 150, as will be understood by one having ordinary skill in the art. Further, biasing the idler gears 150 toward the center of the rotisserie unit 110, keeps the idler gears and skewer rotor gears 121 engaged while the skewer rotors 120 are moved radially inward or outward. Drawing FIG. 12 shows the skewer rotors 120 at a maximum, outward, extended position, while drawing FIG. 13 shows the skewer rotors at an intermediate position, and drawing FIG. 14 shows the skewer rotors at a minimum, or retracted position. One having ordinary skill in the art will appreciate that as the skewer rotors 120 extend radially outward, the lateral distance between adjacent skewer rotors and between adjacent skewer rotor gears 121 increases, and the idler wheels 150 will seat farther down between adjacent skewer rotor gears 121. If the skewer rotors 120 are extended out far enough, the 104 lateral distance between the skewer rotor gears 121 will become large enough at some point that the idler gears 150 can slip between the skewer rotor gears 121 and move toward the center of the rotisserie unit 110. This may present a problem regarding the rotisserie drive-train in that the idler gears 150 may disengage from the skewer rotor gears 121. Thus, one will appreciate that the outward extension of the skewer rotors will preferably be limited to a point where the idler wheels 150 are kept radially outward of the skewer rotor gears 121. Further, the inward bias of the idler gears 150 may also be limited to a minimum inward point. One having ordinary skill in the art will also appreciate that these outer and inward limits are based upon geometric relationships and that the diameters of each of the idler gears 150 and the skewer rotor gears 121 affect the determination of these limits.

Figure 9:
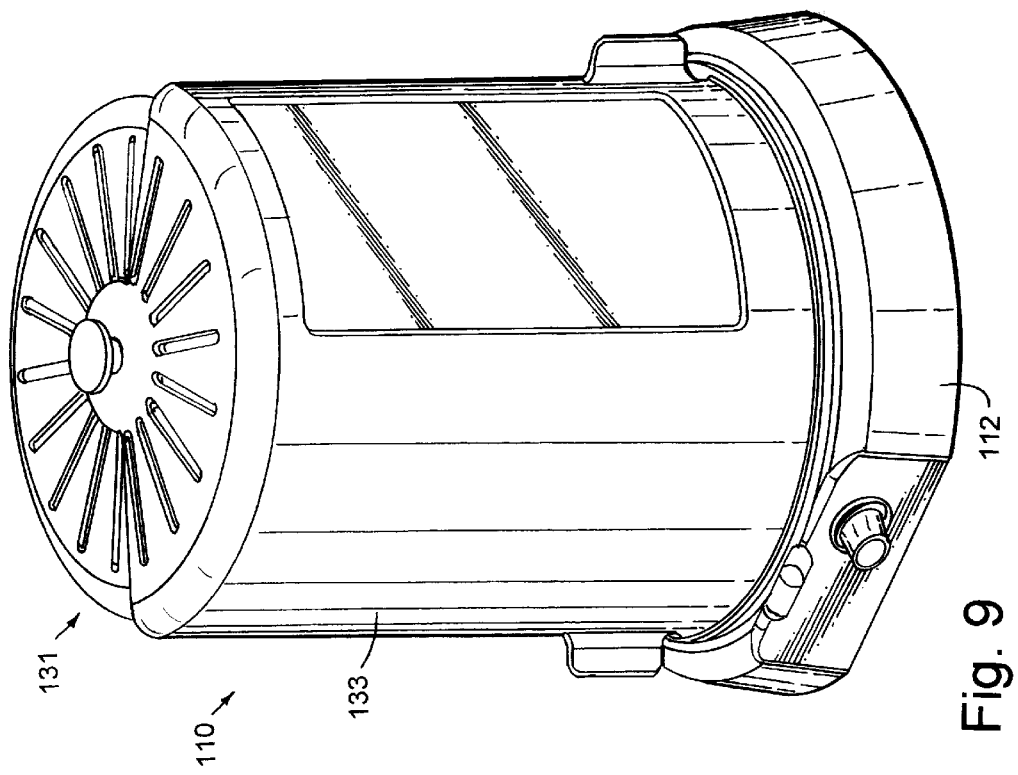
FIG. 9 is a front perspective view of a second embodiment of a shish kebab rotisserie according to the invention.
Figure 10:
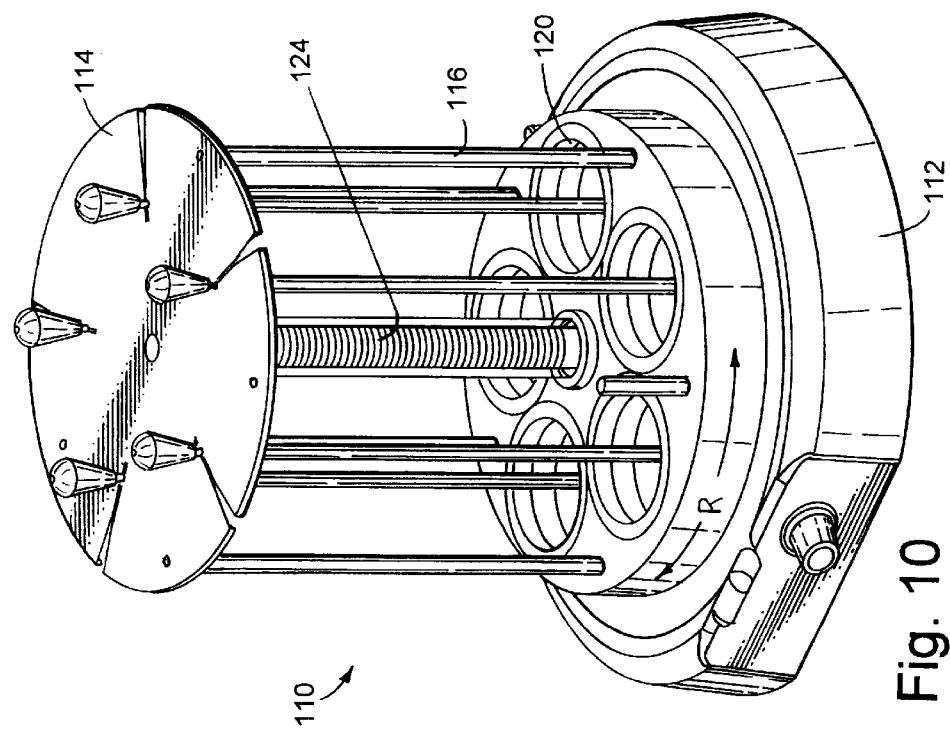
FIG. 10 is the view of FIG. 8 with a splatter shield removed.
Figure 15:
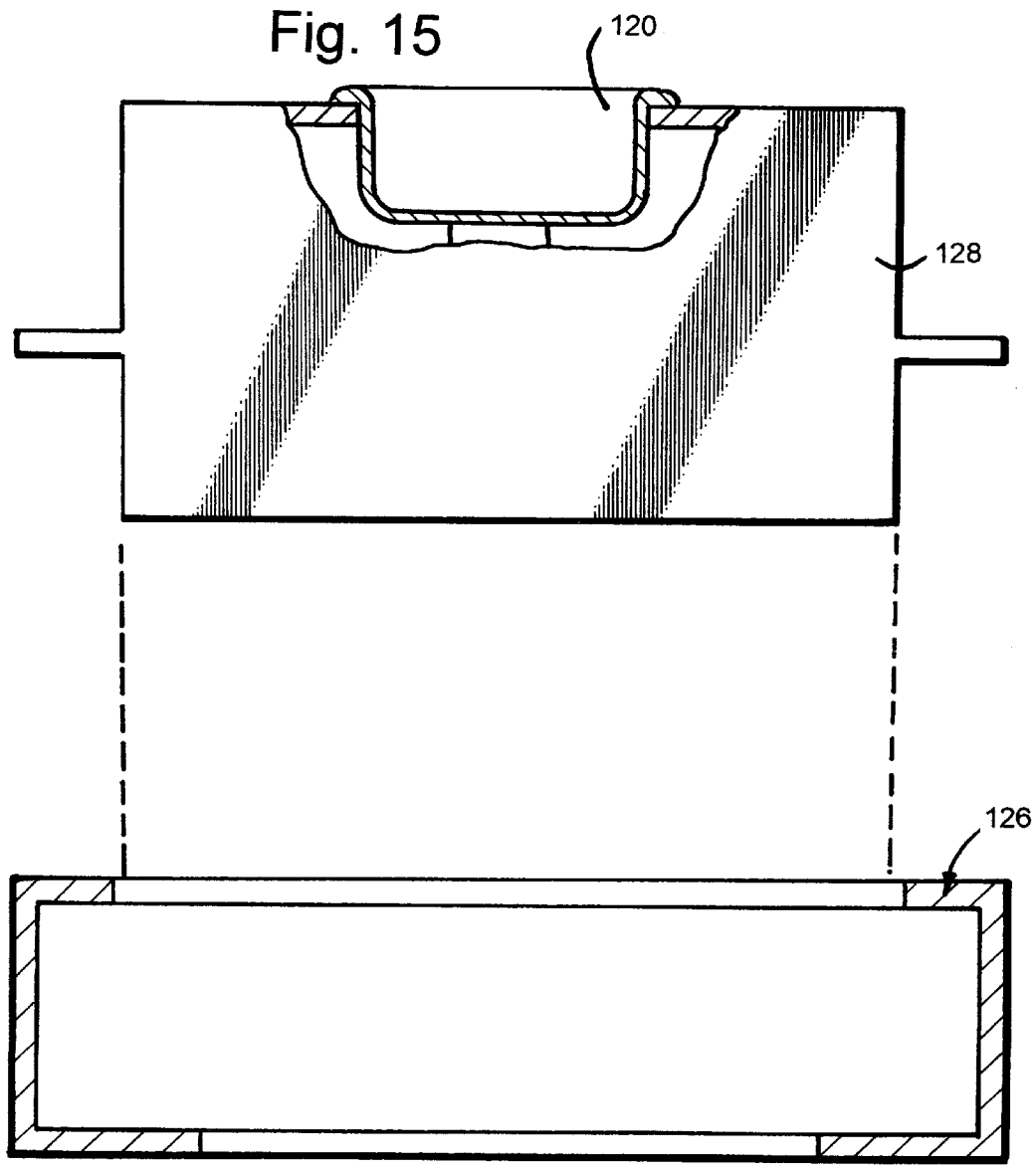
FIG. 15 is an exploded side elevational view of the base thereof, partially in section and showing the concept of the two part base with a drive housing setting in a shell housing.
Figure 16:
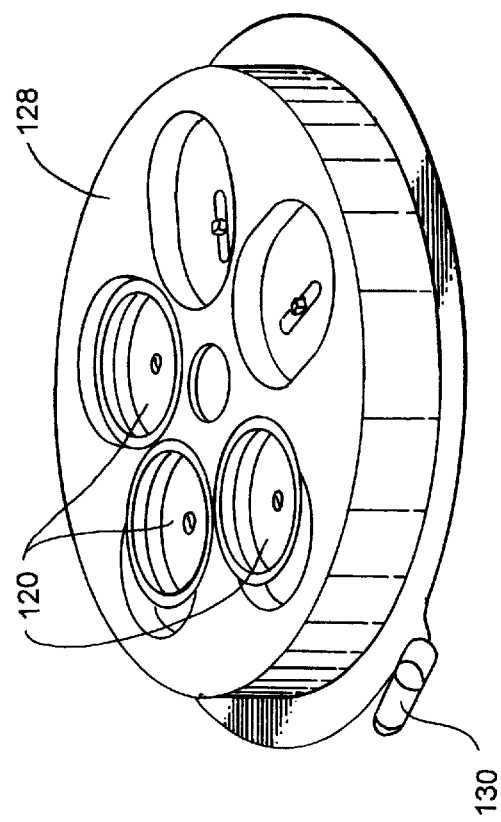
FIG. 16 is a top perspective view of the drive housing thereof.
Figure 17:
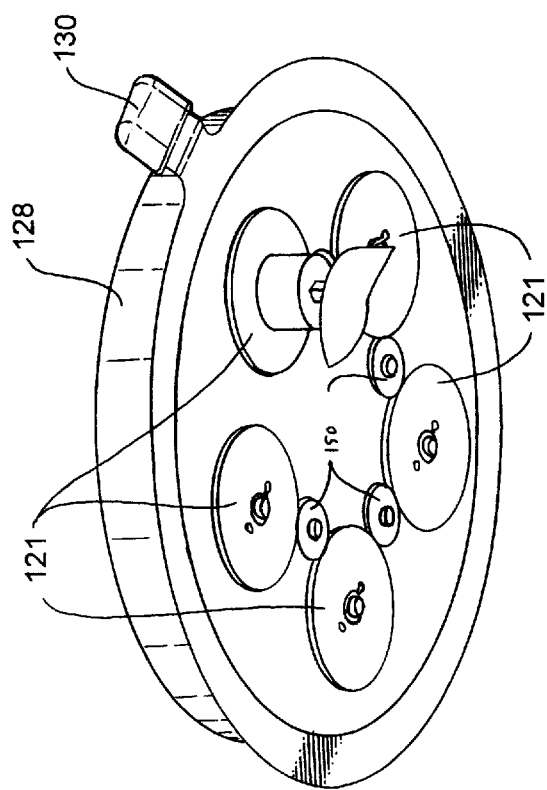
FIG. 17 is a bottom perspective view thereof.
Figure 20:
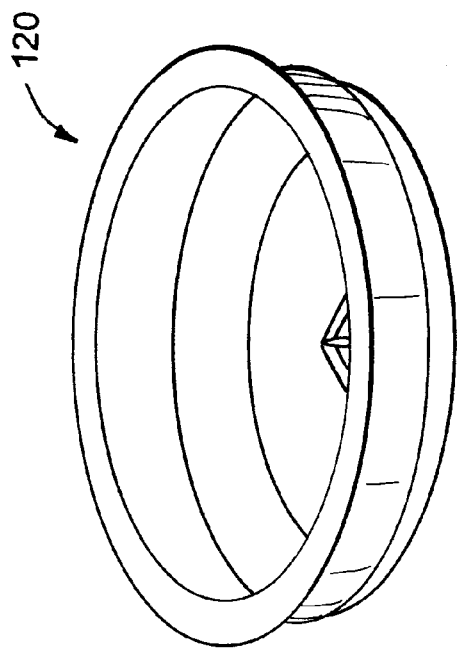
FIG. 20 is a top perspective view thereof.
Figure 19:
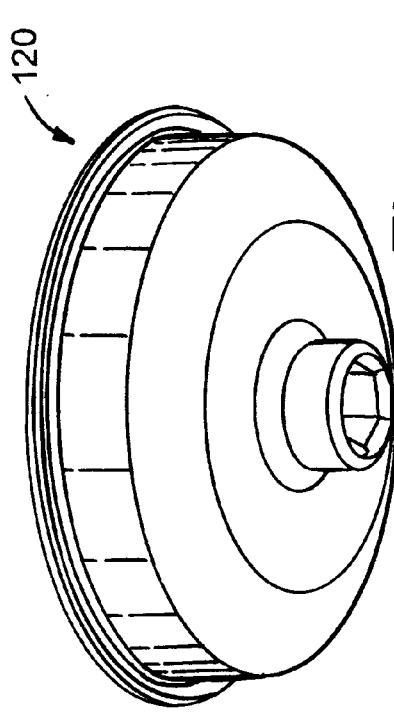
FIG. 19 is a bottom perspective view thereof.
Figure 18:
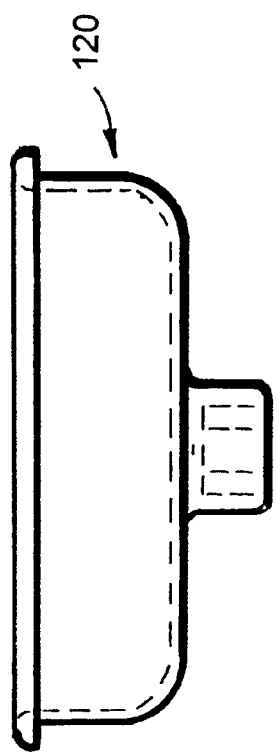
FIG. 18 is a side elevational view of a skewer rotor thereof.
Figure 38:
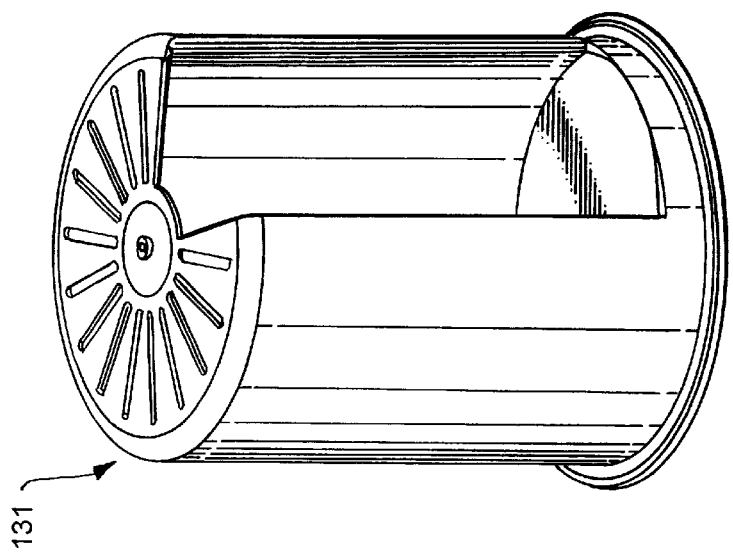
FIG. 38 is an upper perspective view of the enclosure for the shish kebab rotisserie shown in FIG. 9, without the rotating cover.
Figure 33:
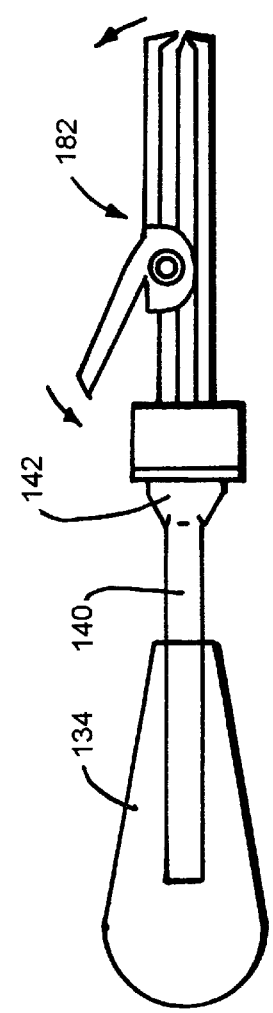
FIG. 33 is a side elevational view of a third alternative embodiment of a skewer handle assembly.

In another aspect of the rotisserie unit 110, the housing or base 112 may be constructed to provide rotation of the various skewer rotors 120 with their associated shish kebab skewers about the center axis of the unit, which coincides with the heater 124 (FIG. 15). This feature provides additional convenience for access to each shish kebab skewer without reaching around or turning the entire rotisserie unit 110. The inventor has found that providing a total arch of rotation of about one hundred eighty degrees (180°), about ninety degrees (90°) to either side of a centered position, provides good access to all the skewer rotors 120 with their associated shish kebab skewers (arrow R in FIG. 10). More particularly, the base 112 may be configured with a housing shell 126 that receives and supports a drive housing 128 (FIGS. 15–17). The drive housing 128 contains the skewer rotor drive-train as discussed in greater detail above, and is rotatably received in the housing shell 126. Thus, the drive housing is preferably provided with a heat resistant handle 130, or the like (FIGS. 16–17). Accordingly, a cooking cover 131 that is desirably provided to retain cooking heat, is provided with a rotatably sliding door 133 (FIGS. 9 and 38). The door 133 slides about seventy to one hundred twenty degrees (70–120°) to reveal a door opening 135 (FIG. 38) that is also about seventy to one hundred twenty degrees (70–120°) of arch wide. The door opening 135 combined with the rotation of the skewers provides good access to each skewer position without removing the cover 131. The variation in the door access is a matter of trade off between heat retention with a smaller access and ease of access with a larger access.

Figure 24:
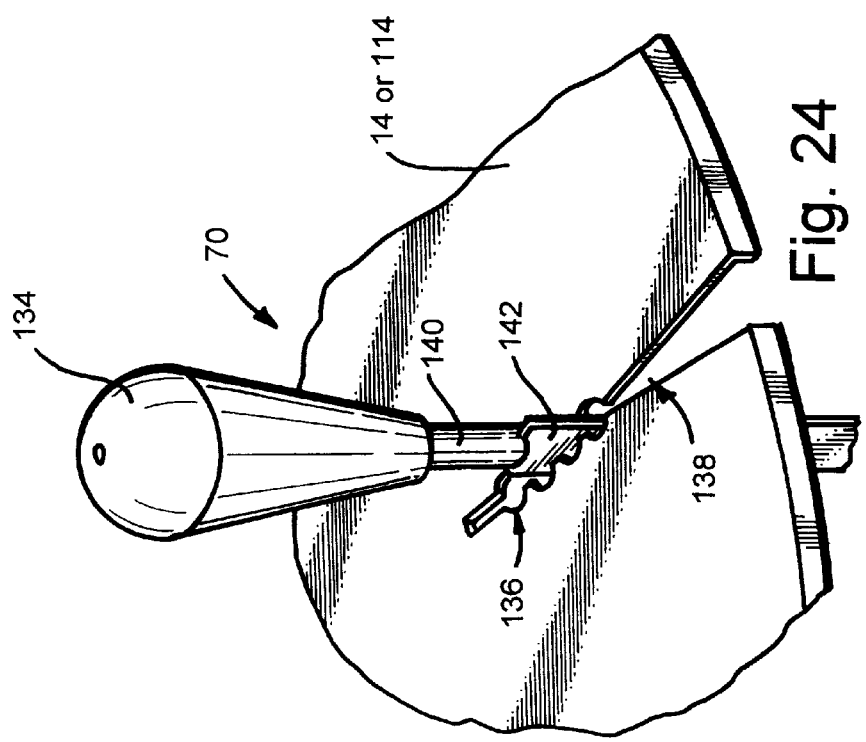
FIG. 24 is another fragmentary top perspective view thereof, showing the skewer moving through the slot, between positioning holes.
Figure 23:
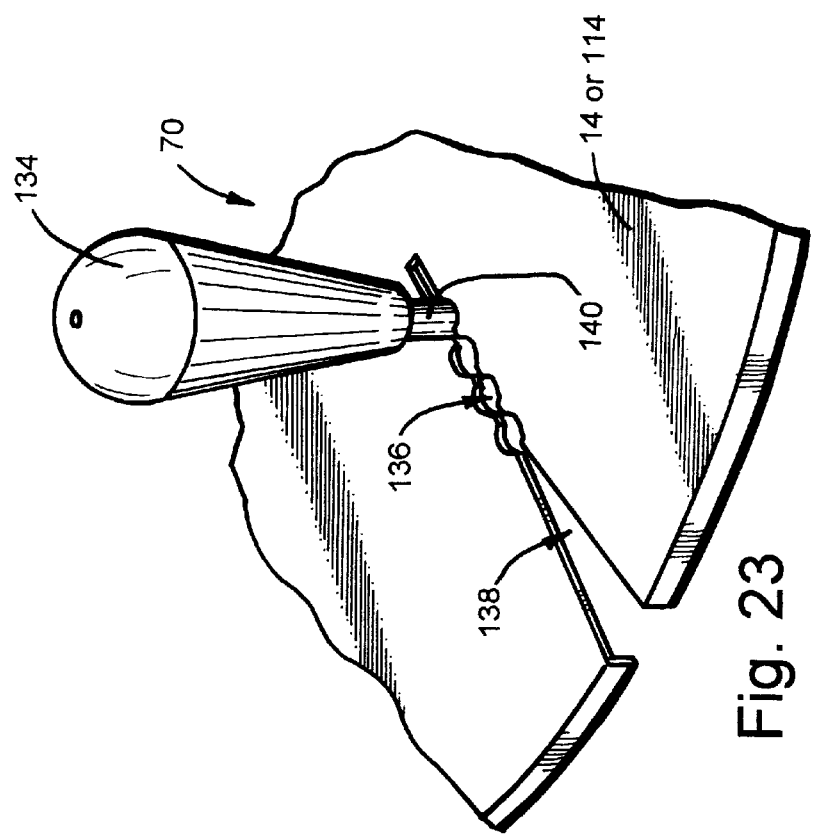
FIG. 23 is a fragmentary top perspective view of the shish kebab rotisserie top plate with a skewer seated in a positioning hole.

More particularly with regard to a shish kebab skewer 70, it is preferably provided with a handle 134 that is heat resistant for comfortable gripping by a user (FIGS. 21–22). To hold the skewer 70 securely in a generally perpendicular relationship with a skewer rotor 120, the top plate 14 or 114 is preferably provided with a series of holes 136 that are interconnected with a slot 138 (FIGS. 23–24). Accordingly, the skewer 70 has a shaft that extends from the handle 134 with a generally cylindrical portion 140 adjacent the handle, that corresponds to the holes 136. The cylindrical portion 140 extends from the handle 134 to a generally flat portion 142 that corresponds to the slot 138. So configured, the flat portion 142 may be oriented to slide through the slot 138 to position the skewer 70 at one of the holes 136 or to remove the skewer from the appliance 10 or 110. When the skewer 70 is positioned at a preselected hole 136, the cylindrical portion 140 may be seated in rotating engagement with the hole. The skewer is securely held in the hole 136 because the cylindrical portion 140 is larger than and can not slide through the slot 138.

The skewer 70 may be configured as a composite skewer with a handle assembly 170, 171, or 172 (FIGS. 25–33), for example. The composite skewer is adapted for use with a bamboo or wood skewer stick 150 or the like, as are commonly known to be used with pre-prepared shish kebab. Thus, the composite skewer facilitates use of the prepared skewer sticks with the shish kebab rotisserie 10 or 110. Each of the composite skewer handle assemblies 170, 171, and 172 is provided with a handle 134, a cylindrical portion 140, and a flat portion 142 as discussed above for insertion, positioning, and removal of the shish kebab, as discussed above. The composite skewer handle assemblies 170, 171, and 172 further include a skewer stick clamp to connect the handle assembly with the skewer stick 150.

The composite skewer handle assembly 170 uses a collet-type chuck clamp 152 (FIGS. 25–30). The collet clamp 152 has a collet with at least two resilient jaws 154 (four jaws are shown) that are circumscribed by a cam ring 156. As is generally known regarding collet chucks, manipulation of the cam ring either presses the jaws together to clamp an item that is positioned between the jaws, in a closed position, or releases the jaws to free the item, in an open position. Specifically as to the collet clamp 152, the collet and jaws 154 have the expected arrangement of a generally cylindrical annular configuration, including a generally cylindrical outer surface 158. While collet chuck devices commonly use a cam ring with a conical interior surface, whereby coaxial movement of the cam ring relative to the collet presses and releases the jaws, the cam ring 156 of the collet clamp 152 has a generally square inner surface 158. Rotation of the cam ring 156, not axial movement, positions the jaws alternatively in alignment with either a corner or a flat of the square surface 158. Thus, the jaws 154 are pressed together when the cam ring 156 is rotated to align the jaws with the flats, in the closed position. Conversely, the jaws 154 are released when the cam ring 156 is rotated to align the jaws with the corners, in the open position. The cam ring 156 may be held in the closed position by any of various methods, including friction, a detent and a recess, or a post and pin, for example, as will be known to one having ordinary skill in the art. The jaws 154 may also be provided with inward projecting barbs 160 to further secure the clamp 152 to the stick 150. Further, while others may choose other geometric relations for the inner surface 158 and the number of jaws 154 on the collet (i.e. a triangular surface and three jaws, a pentagonal surface and five jaws, etceteras, for example), the inventor prefers the four sided inner surface 158 and four jaws 154 on the collet.

The composite skewer handle assembly 172 (FIGS. 31–32) is substantially the same as the composite skewer handle assembly 170, and uses a spring clamp 162 in stead of the collet clamp 152. The spring clamp 162 is modified from a commonly known spring clamp by providing teeth or jaws 164 on a spring hoop 168. The jaws 164 clamp or grasp a skewer stick 150. The jaws are opened by squeezing together a pair of levers 166. Releasing the levers 166 allows the spring hoop to close the jaws 164 together. Alternatively, an alligator-type spring clamp 182 may be substituted for the collet clamp 152 or the spring clamp 162, as in composite skewer handle assembly 174 (FIG. 33), which will be understood by one having ordinary skill in the art. One will further understand that these clamping alternatives are exemplary and that various other clamps may be used without departing from the spirit and scope of the invention.

Figure 36:
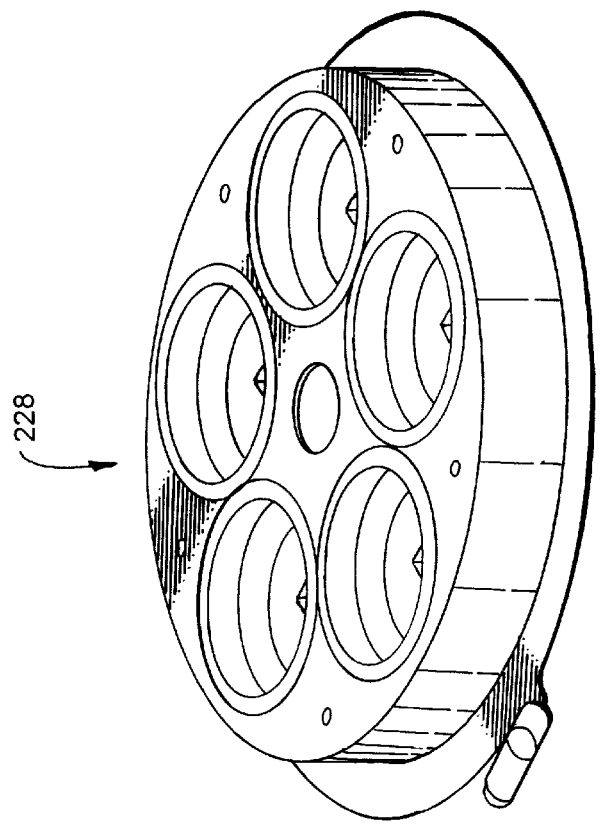
FIG. 36 is the view of FIG. 16 showing an alternative embodiment without the radially moving skewer rotors.
Figure 37:
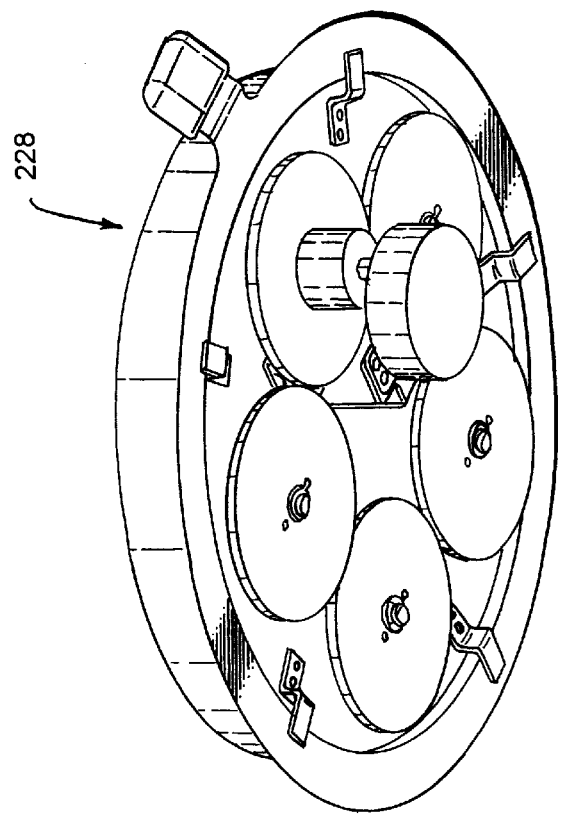
FIG. 37 is the view of FIG. 17 showing the alternative embodiment without the radially moving skewer rotors.

In a further aspect of the invention, the vertically standing skewers 70 are supported at both ends, rather than being cantilevered from the base as is known in other shish kebab or rotisserie cooking appliances. At the lower end of the skewer 70, the tip is releasably received by the adapter 64 in the recess 74, as is discussed in greater detail above. At the upper end of the skewer 70, the shaft of the skewer is removably received in positioning holes 136 (FIGS. 23–34), also discussed in greater detail above. While this feature of securely supporting the skewer at both ends is discussed above in connection with the feature of adjustable positioning of the shish kebab relative to the heater 24 or 124, secure support of the skewer may also be provided independent of the adjustable positioning of the shish kebab relative to the heater. A drive housing 228 without the adjustable positioning feature is shown in FIGS. 36 and 37.

It will be understood by one having ordinary skill in the art and by those who practice the invention, that various modifications and improvements may be made without departing from the by spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

I claim:

1. A shish kebab rotisserie comprising:
    a frame having a base and an opposing top, and having a support member connected between the base and the top to support the top relative to the base;
    a number of skewer rotors connected with the base, each skewer rotor having an axis and being rotatable about its axis;
    a drive operatively connected with the skewer rotors to rotate each skewer rotor about its axis;
    a heat source connected with the base and spaced a distance from the skewer rotors; and
    a skewer extending generally perpendicularly from the base to the top, the skewer being supported at the base by a skewer rotor and being supported by the top, the skewer being releasably coupled with the skewer rotor to rotate with the skewer rotor.

2. The shish kebab rotisserie of claim 1, wherein the skewer extends beyond the top to a handle portion of the skewer, a shaft extends from the handle portion toward the skewer rotor, the shaft has a generally cylindrical portion adjacent the handle portion, and the shaft has a generally flat portion adjacent the cylindrical portion and opposite the handle portion.

3. The shish kebab rotisserie of claim 2, wherein the top has a perimeter edge, the top has a slot extending inward from the perimeter edge, and the top has at least one skewer support hole along the slot, whereby the skewer shaft flat portion slides through the slot and the skewer shaft cylindrical portion rotatably seats in the hole.

4. The shish kebab rotisserie of claim 3, further including an adjustment mechanism connected between the heat source and the skewer rotors to adjust the distance between the heat source and the skewer rotors.

5. The shish kebab rotisserie of claim 4, wherein locations of the skewer rotors are fixed relative to the base and manipulation of the adjustment mechanism moves the heat source toward and away from the skewer rotors.

6. The shish kebab rotisserie of claim 5, wherein the skewer further includes a clamp adjacent the flat portion and opposite the cylindrical portion, and wherein that portion of the skewer shaft from the clamp to the skewer rotor is a skewer stick that is clamped in the clamp.

7. The shish kebab rotisserie of claim 4, wherein location of the heat source is fixed relative to the base and manipulation of the adjustment mechanism moves the skewer rotors toward and away from the heat source.

8. The shish kebab rotisserie of claim 7, wherein the skewer further includes a clamp adjacent the flat portion and opposite the cylindrical portion, and wherein that portion of the skewer shaft from the clamp to the skewer rotor is a skewer stick that is clamped in the clamp.

9. The shish kebab rotisserie of claim 3, wherein the skewer further includes a clamp adjacent the flat portion and opposite the cylindrical portion, and wherein that portion of the skewer shaft from the clamp to the skewer rotor is a skewer stick that is clamped in the clamp.

10. The shish kebab rotisserie of claim 1, wherein the base includes a drive housing and a shell housing, and wherein the drive housing and the shell housing are rotatably connected.

11. A shish kebab rotisserie comprising:
    a frame having a base and an opposing top, and having a support member connected between the base and the top to support the top relative to the base;
    a number of skewer rotors connected with the base, each skewer rotor having an axis and being rotatable about its axis;
    a drive operatively connected with the skewer rotors to rotate each skewer rotor about its axis;
    a heat source connected with the base and spaced a distance from the skewer rotors; and
    an adjustment mechanism connected between the heat source and the skewer rotors to adjust the distance between the heat source and the skewer rotors.

12. The shish kebab rotisserie of claim 11, wherein locations of the skewer rotors are fixed relative to the base and manipulation of the adjustment mechanism moves the heat source toward and away from the skewer rotors.

13. The shish kebab rotisserie of claim 12, wherein a skewer extends generally perpendicularly from the base to the top, the skewer is supported at the base by a skewer rotor and is supported by the top, the skewer being releasably coupled with the skewer rotor to rotate with the skewer rotor.

14. The shish kebab rotisserie of claim 11, wherein location of the heat source is fixed relative to the base and manipulation of the adjustment mechanism moves the skewer rotors toward and away from the heat source.

15. The shish kebab rotisserie of claim 13, wherein a skewer extends generally perpendicularly from the base to the top, the skewer is supported at the base by a skewer rotor and is supported by the top, the skewer being releasably coupled with the skewer rotor to rotate with the skewer rotor.

16. The shish kebab rotisserie of claim 11, wherein the base includes a drive housing and a shell housing, and wherein the drive housing and the shell housing are rotatably connected.

17. The shish kebab rotisserie of claim 11, wherein a skewer extends generally perpendicularly from the base to the top, the skewer is supported at the base by a skewer rotor and is supported by the top, the skewer being releasably coupled with the skewer rotor to rotate with the skewer rotor.

18. The shish kebab rotisserie of claim 17, wherein the skewer extends beyond the top to a handle portion of the skewer, a shaft extends from the handle portion toward the skewer rotor, the shaft has a generally cylindrical portion adjacent the handle portion, and the shaft has a generally flat portion adjacent the cylindrical portion and opposite the handle portion.

19. The shish kebab rotisserie of claim 18, wherein the top has a perimeter edge, the top has a slot extending inward from the perimeter edge, and the top has at least one skewer support hole along the slot, whereby the skewer shaft flat portion slides through the slot and the skewer shaft cylindrical portion rotatably seats in the hole.

20. The shish kebab rotisserie of claim 19, wherein the skewer further includes a clamp adjacent the flat portion and opposite the cylindrical portion, and wherein that portion of the skewer shaft from the clamp to the skewer rotor is a skewer stick that is clamped in the clamp.

21. The shish kebab rotisserie of claim 1, wherein the skewer has a handle portion, a shaft extending from the handle portion toward the skewer rotor, and a clamp interposed between the handle and the shaft, and wherein the shaft is clamped in the clamp and connected with the handle.

22. The shish kebab rotisserie of claim 11, further including at least one skewer, the skewer having a handle portion, a shaft extending from the handle portion and a clamp being interposed between the handle and the shaft, whereby the shaft is clamped in the clamp and connected with the handle.

* * * * *

UNITED STATES PATENT AND TRADEMARK OFFICE
CERTIFICATE OF CORRECTION

PATENT NO : 6,047,633
DATED : Apr. 11, 2000
INVENTOR(S): Khaytman, Yefim B.

It is certified that error appears in the above-identified patent and that said Letters Patent are hereby corrected as shown below Column 7, line 35, "the 104 lateral distance" should be -- the lateral distance --.

Signed and Sealed this

Third Day of April, 2001

*Attest:*

NICHOLAS P. GODICI

*Attesting Officer*     *Acting Director of the United States Patent and Trademark Office*